US010197769B2

(12) United States Patent
Ichikawa et al.

(10) Patent No.: US 10,197,769 B2
(45) Date of Patent: Feb. 5, 2019

(54) SINGLE-FOCUS OPTICAL SYSTEM AND OPTICAL APPARATUS USING THE SAME

(71) Applicant: OLYMPUS CORPORATION, Hachioji-shi, Tokyo (JP)

(72) Inventors: Keisuke Ichikawa, Tama (JP); Shinichi Mihara, Tama (JP)

(73) Assignee: OLYMPUS CORPORATION, Tokyo (JP)

(*) Notice: Subject to any disclaimer, the term of this patent is extended or adjusted under 35 U.S.C. 154(b) by 0 days.

(21) Appl. No.: 15/808,278

(22) Filed: Nov. 9, 2017

(65) Prior Publication Data

US 2018/0074289 A1 Mar. 15, 2018

Related U.S. Application Data

(63) Continuation of application No. PCT/JP2015/065801, filed on Jun. 1, 2015.

(51) Int. Cl.
*G02B 9/64* (2006.01)
*G02B 13/18* (2006.01)
(Continued)

(52) U.S. Cl.
CPC ............... *G02B 9/64* (2013.01); *G02B 9/00* (2013.01); *G02B 13/00* (2013.01); *G02B 13/18* (2013.01);
(Continued)

(58) Field of Classification Search
CPC ...... G02B 13/0045; G02B 7/021; G02B 9/64; G02B 5/005; G02B 13/18; G02B 13/006; G02B 7/04; G02B 21/36
(Continued)

(56) References Cited

U.S. PATENT DOCUMENTS 7,123,421 B1* 10/2006 Moskovich ............ G02B 13/18
359/683
8,018,663 B2* 9/2011 Ohashi .................. G02B 13/04
359/771
(Continued)

FOREIGN PATENT DOCUMENTS

JP 2004101880 A 4/2004
JP 2005164839 A 6/2005
(Continued)

OTHER PUBLICATIONS

International Preliminary Report on Patentability (IPRP) dated Dec. 14, 2017 in counterpart International Application No. PCT/JP2015/065801.
(Continued)

*Primary Examiner* — Evelyn A Lester
(74) *Attorney, Agent, or Firm* — Holtz, Holtz & Volek PC

(57) ABSTRACT

A single-focus optical system includes a first lens unit having a positive refractive power, a second lens unit having a negative refractive power, and a third lens unit having a positive refractive power. The first lens unit includes at least a first sub-unit, a second sub-unit, and a third sub-unit. The first sub-unit includes one of, a one negative lens component and a plurality of negative lens components that are continuous, the second sub-unit includes two meniscus lens components having respective concave surfaces thereof facing mutually, and the third sub-unit includes a plurality of positive lens components disposed closest to the reduction side in the third sub unit. The second lens unit includes one negative lens component. The third lens unit includes negative lens, and also includes a positive lens component closest to the enlargement side. All air spaces in the first lens unit are constant.

22 Claims, 17 Drawing Sheets

(51) Int. Cl.
*G02B 9/00* (2006.01)
*G02B 7/04* (2006.01)
*G02B 13/00* (2006.01)
*G02B 5/00* (2006.01)
*G02B 7/02* (2006.01)
*G02B 21/36* (2006.01)

(52) U.S. Cl.
CPC ............ *G02B 5/005* (2013.01); *G02B 7/021* (2013.01); *G02B 7/04* (2013.01); *G02B 13/006* (2013.01); *G02B 13/0045* (2013.01); *G02B 21/36* (2013.01)

(58) Field of Classification Search
USPC .................. 359/740, 745–793, 819–823
See application file for complete search history.

(56) References Cited

U.S. PATENT DOCUMENTS

| | | |
|---|---|---|
| 2006/0280498 A1 | 12/2006 | Souma et al. |
| 2009/0109548 A1 | 4/2009 | Kimura |
| 2009/0109551 A1 | 4/2009 | Hatada |
| 2010/0033848 A1 | 2/2010 | Hatada |
| 2010/0073775 A1 | 3/2010 | Ichimura et al. |
| 2011/0090574 A1 | 4/2011 | Harada et al. |
| 2011/0235191 A1* | 9/2011 | Kawamura ............ G02B 7/04 359/717 |
| 2012/0257100 A1 | 10/2012 | Imaoka et al. |
| 2013/0163094 A1* | 6/2013 | Takada .................. G02B 15/14 359/684 |
| 2013/0293767 A1 | 11/2013 | Imaoka et al. |
| 2013/0314588 A1* | 11/2013 | Kim ....................... G02B 13/02 348/360 |
| 2014/0132709 A1* | 5/2014 | Satoh ................... G02B 19/008 348/36 |
| 2014/0233113 A1* | 8/2014 | Harada ................ G02B 23/243 359/781 |
| 2018/0052300 A1* | 2/2018 | Ichikawa ................. G02B 9/64 |
| 2018/0052310 A1* | 2/2018 | Ichikawa ................. G02B 9/64 |
| 2018/0067281 A1* | 3/2018 | Ichikawa ............ H04N 5/2253 |
| 2018/0067282 A1* | 3/2018 | Ichikawa ................ G02B 7/04 |

FOREIGN PATENT DOCUMENTS

| | | |
|---|---|---|
| JP | 2006343554 A | 12/2006 |
| JP | 2007225804 A | 9/2007 |
| JP | 2008209829 A | 9/2008 |
| JP | 2009109630 A | 5/2009 |
| JP | 2009109723 A | 5/2009 |
| JP | 2010039340 A | 2/2010 |
| JP | 2010078696 A | 4/2010 |
| JP | 2010097207 A | 4/2010 |
| JP | 2011059290 A | 3/2011 |
| JP | 2012226309 A | 11/2012 |

OTHER PUBLICATIONS

International Search Report (ISR) and Written Opinion dated Aug. 25, 2015 issued in International Application No. PCT/JP2015/065801.

* cited by examiner

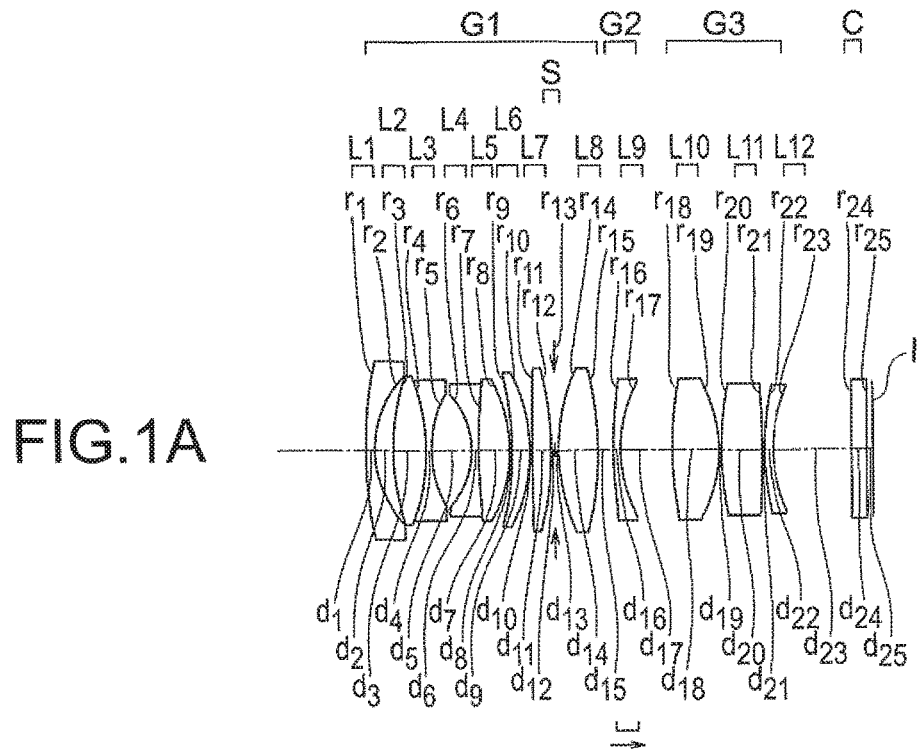
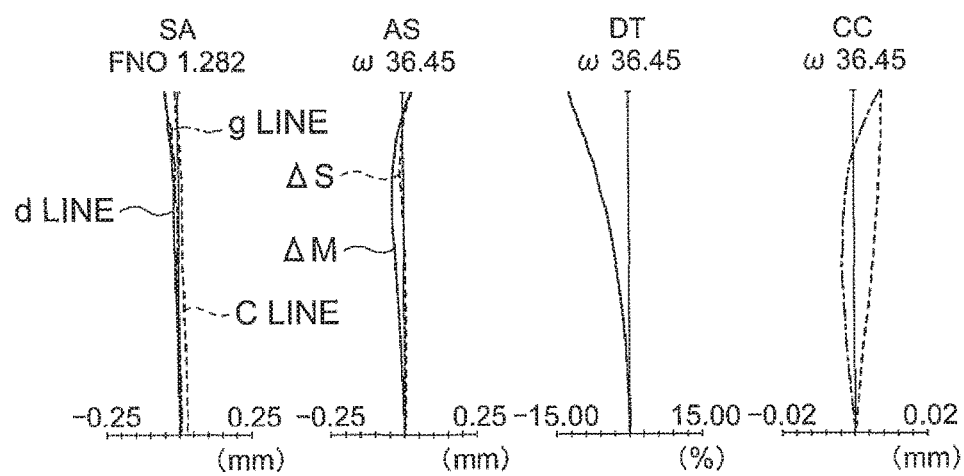

SA       AS      DT      CC
FNO 1.288  ω 36.48  ω 36.48  ω 36.48

-0.25  0.25  -0.25  0.25  -15.00  15.00  -0.02  0.02
(mm)        (mm)         (%)          (mm)

SA      AS      DT      CC
FNO 1.288  ω 25.82  ω 25.82  ω 25.82

-0.25   0.25  -0.25   0.25  -15.00   15.00  -0.02   0.02
      (mm)          (mm)          (%)           (mm)

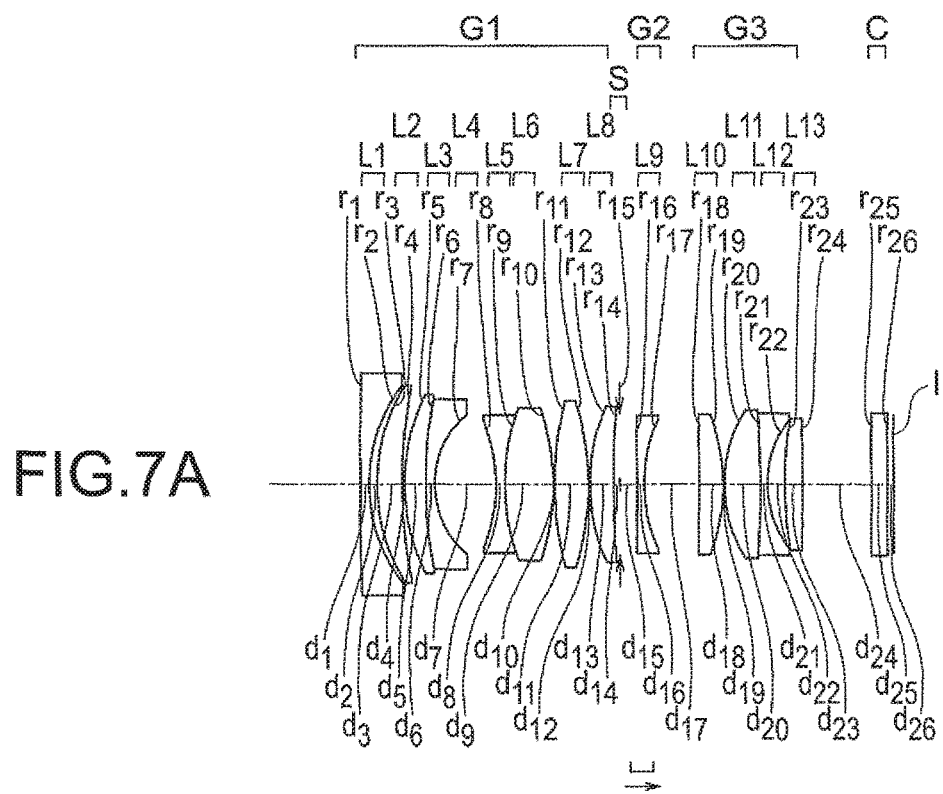
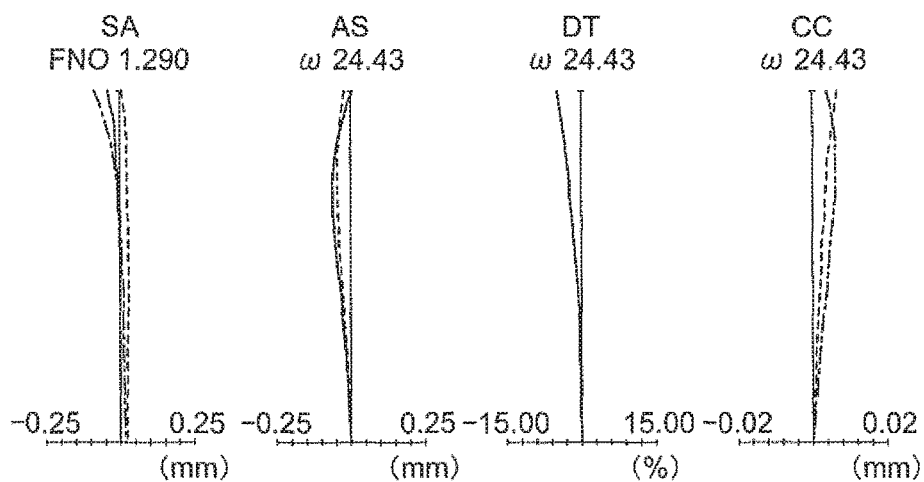

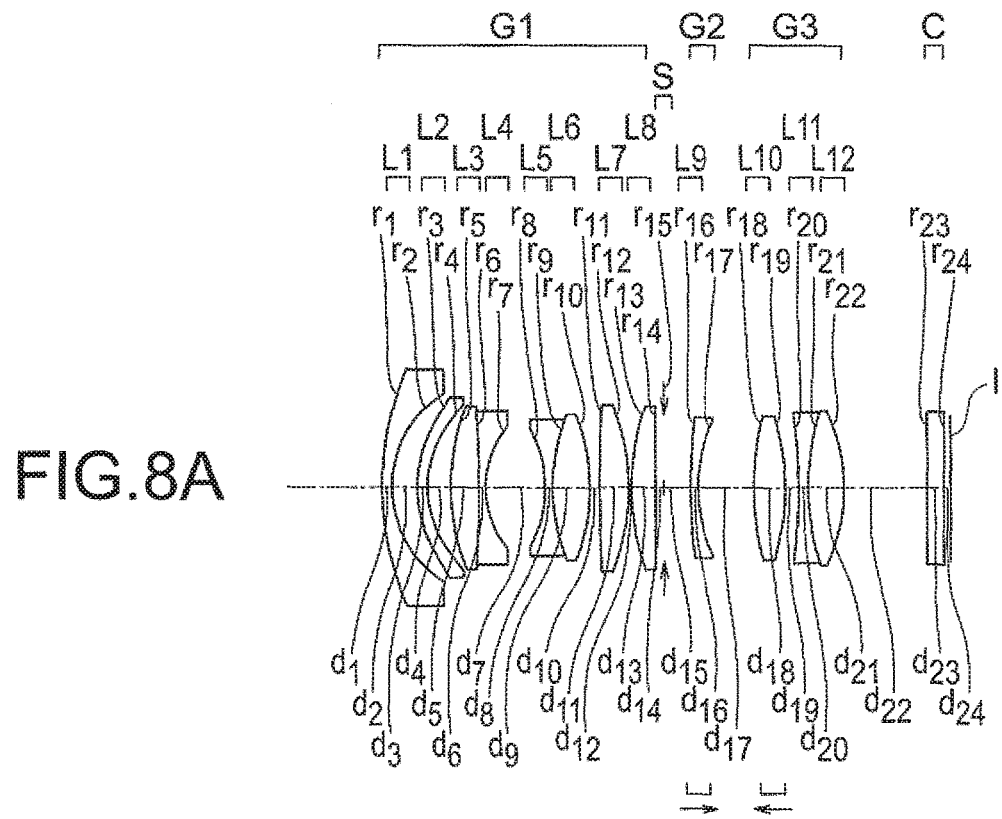
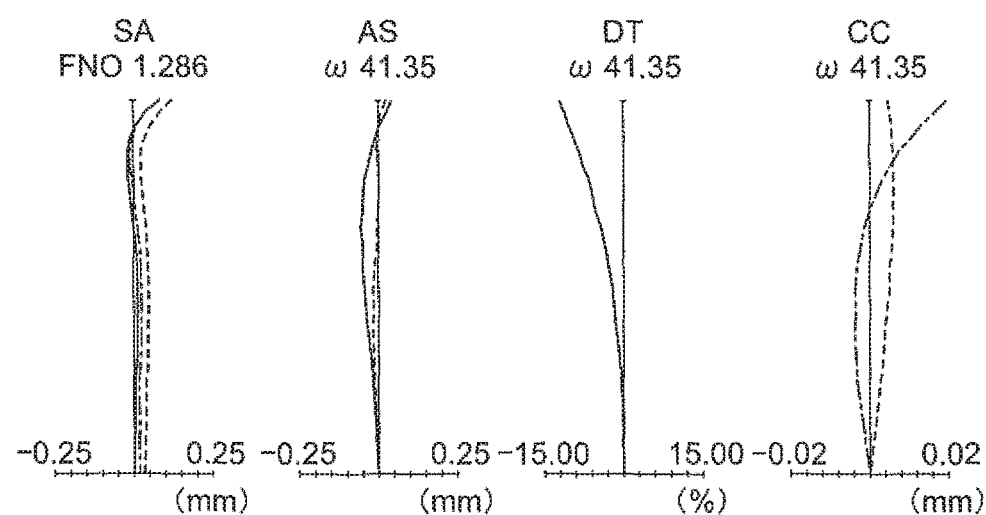

SA      AS      DT      CC
FNO 1.285  ω 41.49  ω 41.49  ω 41.49

-0.25  0.25  -0.25  0.25  -15.00  15.00  -0.02  0.02
(mm)         (mm)         (%)          (mm)

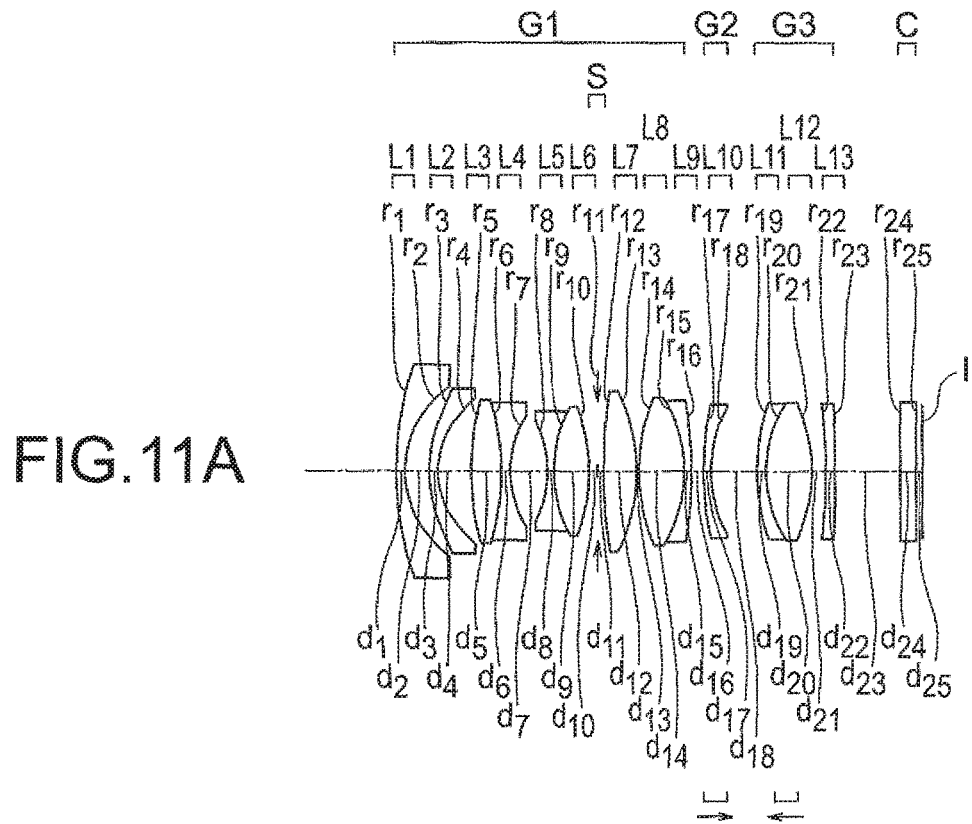
FIG.11A
FIG.11B  FIG.11C  FIG.11D  FIG.11E
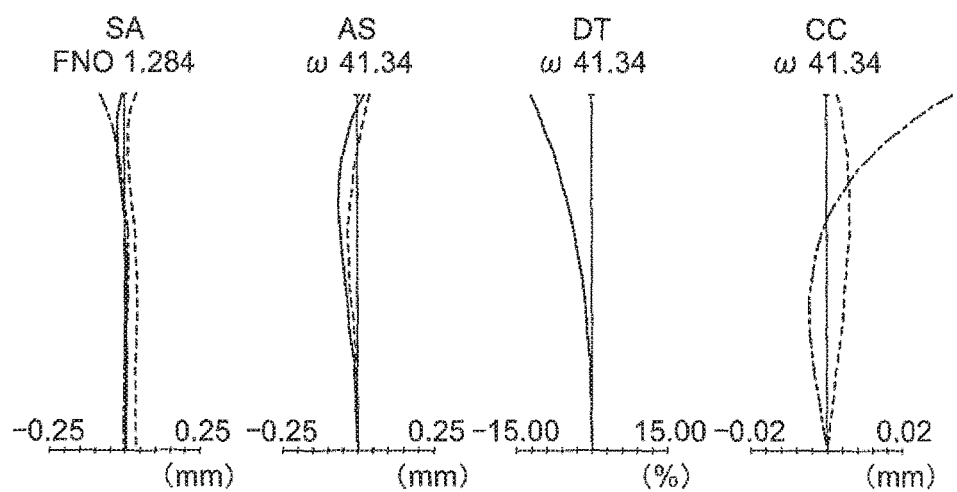

SA
FNO 1.283

AS
ω 40.19

DT
ω 40.19

CC
ω 40.19

-0.25    0.25  -0.25    0.25  -15.00    15.00  -0.02    0.02
   (mm)          (mm)           (%)             (mm)

SINGLE-FOCUS OPTICAL SYSTEM AND OPTICAL APPARATUS USING THE SAME

CROSS-REFERENCE TO RELATED APPLICATION

The present application is a continuation application of International Application No. PCT/JP2015/065801 filed on Jun. 1, 2015, the entire contents of which are incorporated herein by reference.

BACKGROUND OF THE INVENTION

Field of the Invention

The present invention relates to a single-focus optical system and an optical apparatus using the same.

Description of the Related Art

As a type of an image forming optical system having a high imaging performance, a Gaussian type has been known. A Gaussian type optical system includes in order from an object side, an object-side unit having a positive refractive power and an image-side unit having a positive refractive power.

The object-side unit includes two to three positive lenses and one negative lens. This negative lens is cemented to the positive lens immediately before the negative lens in some cases. Moreover, the image-side unit includes one negative lens and two to three positive lenses. This negative lens also, is cemented to the positive lens immediately before the negative lens in some cases.

Moreover, in the Gaussian type optical system, a shape on the object side and a shape on an image side is, by and large, symmetrical about a central portion thereof, and moreover, the Gaussian type optical system has a concentric shape. In the concentric shape, a center of curvature of two lens surfaces in each lens is positioned near the central portion.

Accordingly, in the Gaussian type optical system, even with a large aperture ratio, each aberration is corrected favorably to some extent. However, when an attempt is made to realize an imaging performance superior to that of the conventional one, in the Gaussian type optical system, an angle of view slightly smaller than 50 degrees is the limit. Therefore, in the Gaussian type optical system, realization of the wide angle of view not smaller than 50 degrees is difficult.

Various types of wide-angle taking lenses in which these issues are solved, have been proposed. In the wide-angle taking lens that has been proposed, an F-number is about 1.4. As examples of an optical system of wide-angle taking lens with a wide angle of view and a small F-number, optical systems disclosed in Japanese Patent Application Laid-open Publication No. 2012-226309, Japanese Patent Application Laid-open Publication No. 2004-101880, Japanese Patent Application Laid-open Publication No. 2009-109723, Japanese Patent Application Laid-open Publication No. 2010-039340, Japanese Patent Application Laid-open Publication No. 2010-097207, and Japanese Patent Application Laid-open Publication No. 2011-059290 are known.

SUMMARY OF THE INVENTION

A single-focus optical system according to the present invention which forms a conjugate relationship between a conjugate point on an enlargement side at a long distance and a conjugate point on a reduction side at a short distance, comprises in order from the enlargement side, a first lens unit having a positive refractive power,
a second lens unit having a negative refractive power, and
a third lens unit having a positive refractive power, wherein a lens component is one of a single lens and a cemented lens, and the first lens unit includes in order from the enlargement side, either a first sub-unit, a second sub-unit, and a third sub-unit, or the first sub-unit, one positive lens component, the second sub-unit, and the third sub-unit, and the first sub-unit includes one of a one negative lens component and a plurality of negative lens components that are continuous, and the second sub-unit includes two meniscus lens components having respective concave surfaces thereof facing mutually, and the third sub-unit includes a plurality of positive lens components disposed closest to the reduction side in the third sub-unit, and the plurality of positive lens components includes all positive lens components that are adjacent, and the second lens unit includes one negative lens component, and the third lens unit includes a negative lens, and also includes a positive lens component closest to the enlargement side, and all air spaces in the first lens unit are constant.

Moreover, an optical apparatus of the present invention comprises an optical system, and an image pickup element which is disposed on a reduction side, wherein the image pickup element has an image pickup surface, and converts an image formed on the image pickup surface by the optical system to an electric signal, and the optical system is the abovementioned single-focus optical system.

Moreover, another optical apparatus of the present invention comprises an optical system, and a display element which is disposed on a reduction side, wherein the display element has a display surface, and an image displayed on the display surface is projected on the enlargement side by the optical system, and the optical system is the abovementioned single-focus optical system.

BRIEF DESCRIPTION OF THE DRAWINGS

FIG. 1A, and FIG. 1B, FIG. 1C, FIG. 1D, and FIG. 1E are a cross-sectional view and aberration diagrams respectively, of a single-focus optical system according to an example 1;

FIG. 7A, and FIG. 7B, FIG. 7C, FIG. 7D, and FIG. 7E are a cross-sectional view and aberration diagrams respectively, of a single-focus optical system according to an example 7;

FIG. 8A, and FIG. 8B, FIG. 8C, FIG. 8D, and FIG. 8E are a cross-sectional view and aberration diagrams respectively, of a single-focus optical system according to an example 8;

FIG. 11A, and FIG. 11B, FIG. 11C, FIG. 11D, and FIG. 11E are a cross-sectional view and aberration diagrams respectively, of a single-focus optical system according to an example 11;

DETAILED DESCRIPTION OF THE INVENTION

Figure 2A:
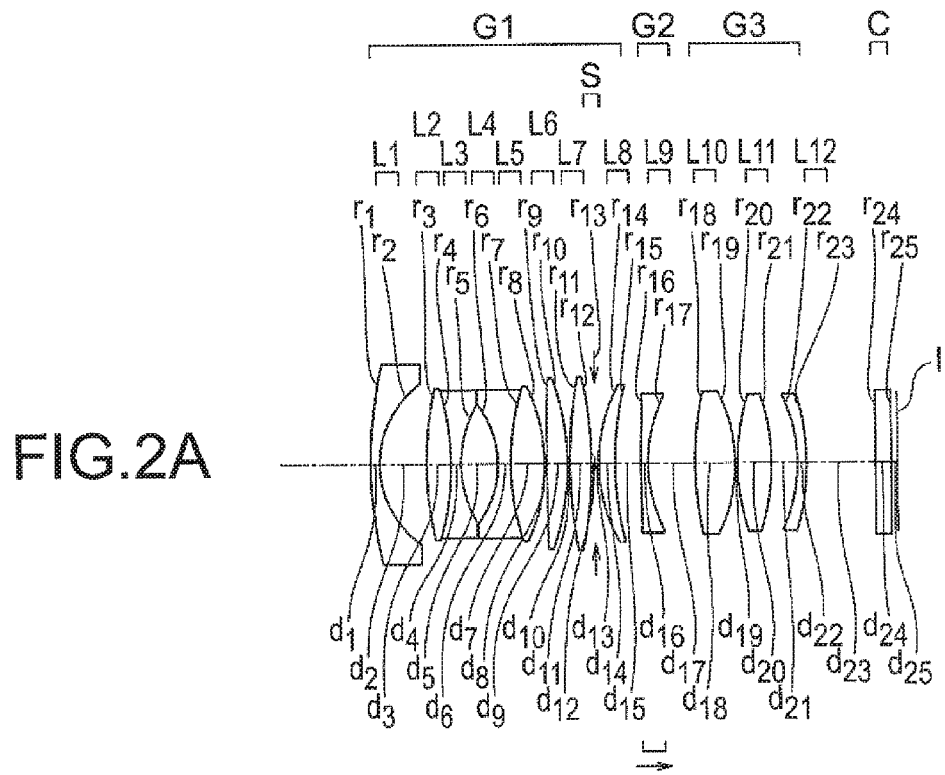
FIG. 2A, and FIG. 2B, FIG. 2C, FIG. 2D, and FIG. 2E are a cross-sectional view and aberration diagrams respectively, of a single-focus optical system according to an example 2.
Figures 2B, 2C, 2D, 2E:
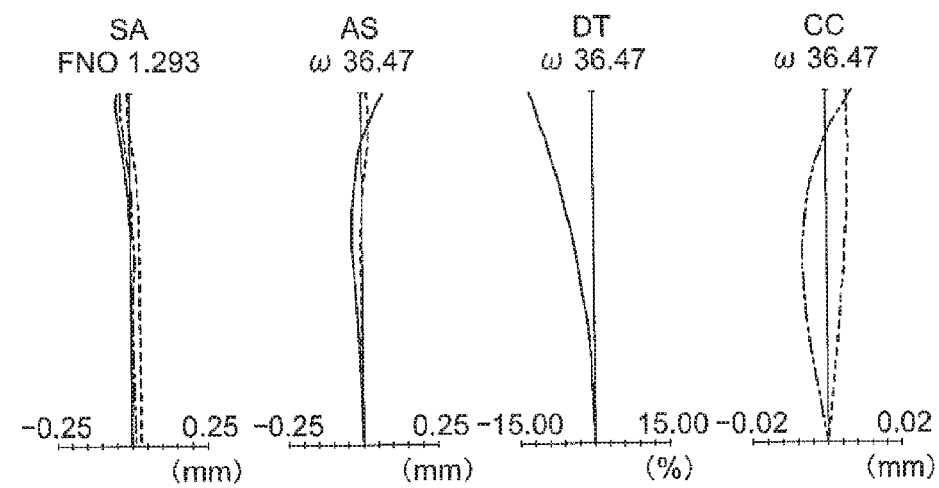
Figure 3A:
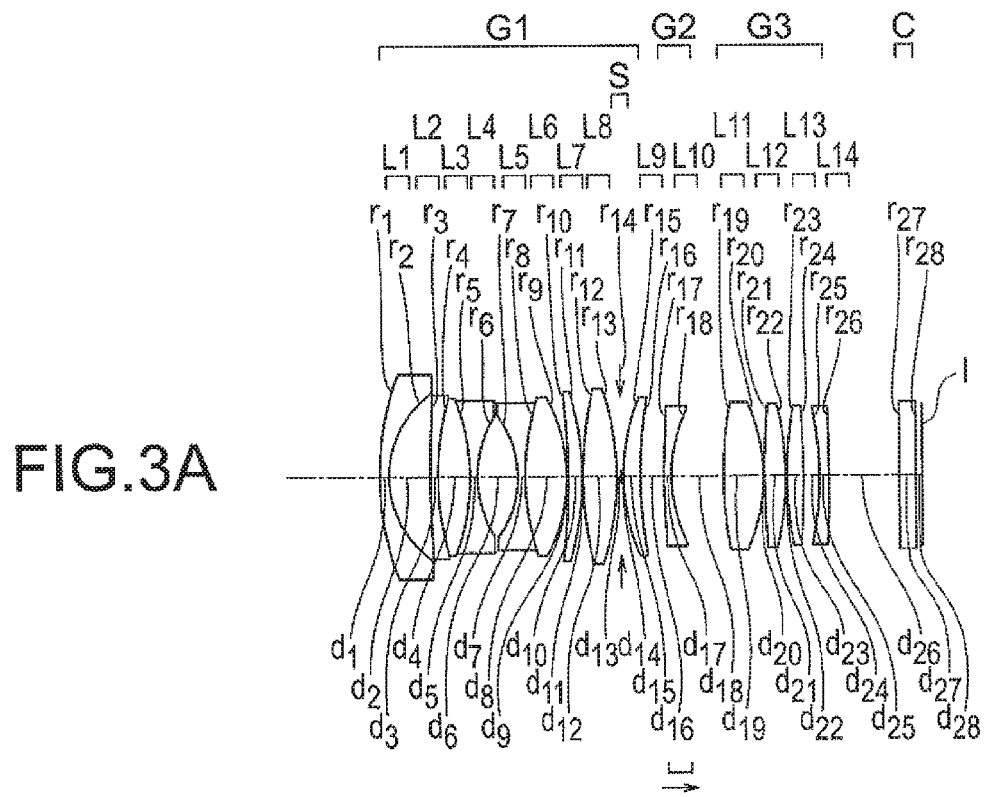
FIG. 3A, and FIG. 3B, FIG. 3C, FIG. 3D, and FIG. 3E are a cross-sectional view and aberration diagrams respectively, of a single-focus optical system according to an example 3.
Figures 3B, 3C, 3D, 3E:
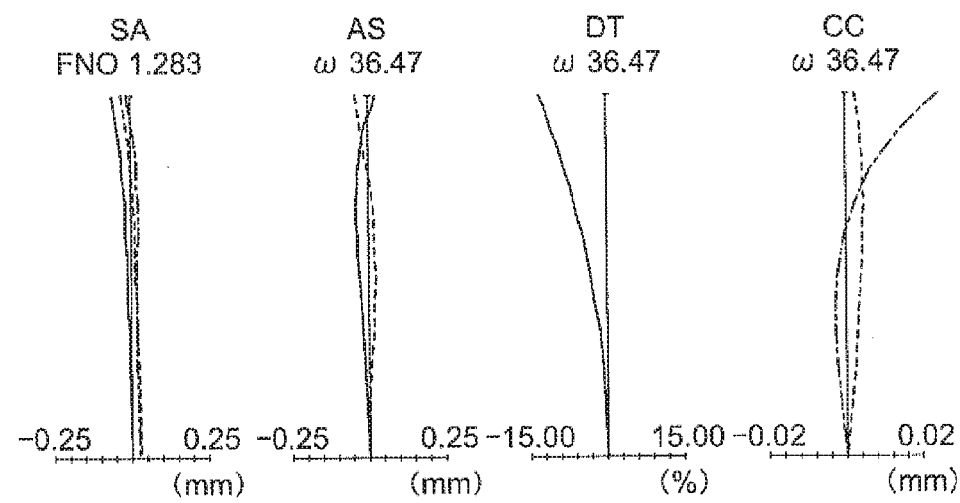
Figure 4A:
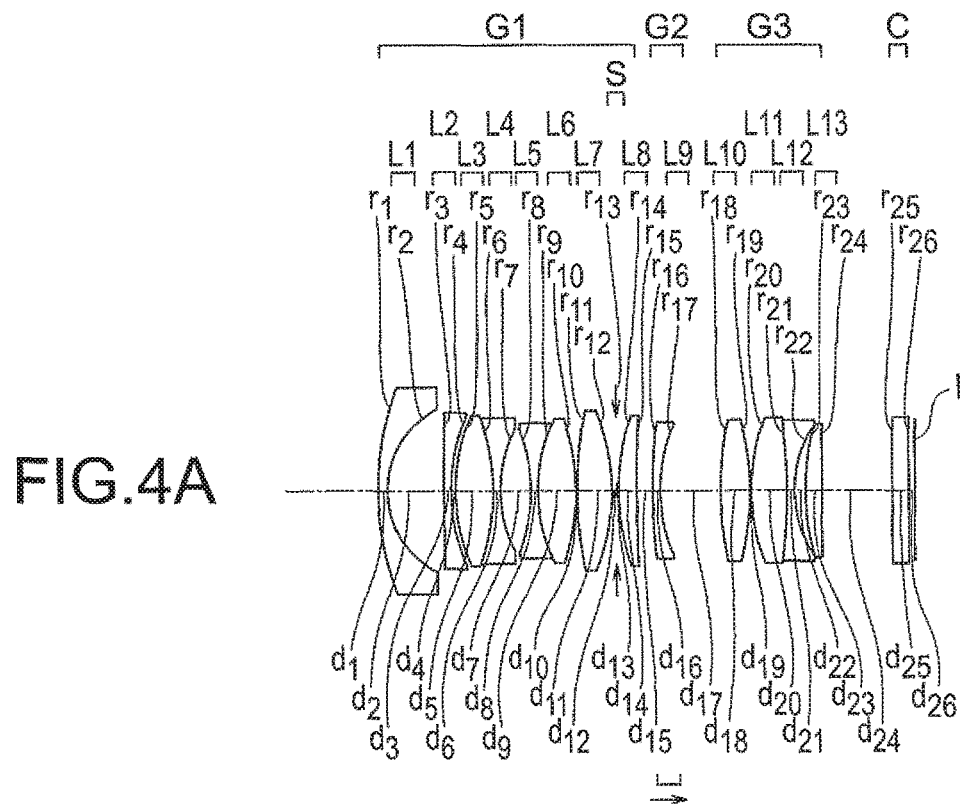
FIG. 4A, and FIG. 4B, FIG. 4C, FIG. 4D, and FIG. 4E are a cross-sectional view and aberration diagrams respectively, of a single-focus optical system according to an example 4.
Figures 4B, 4C, 4D, 4E:
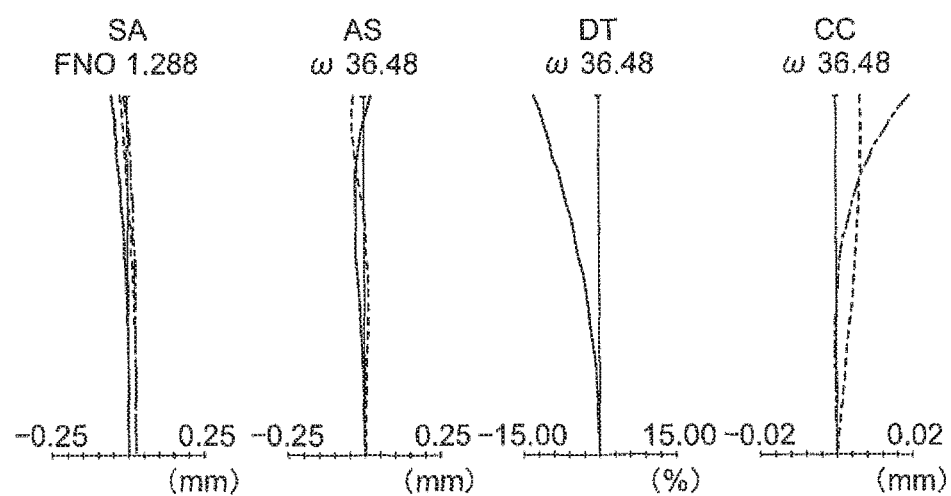
Figure 5A:
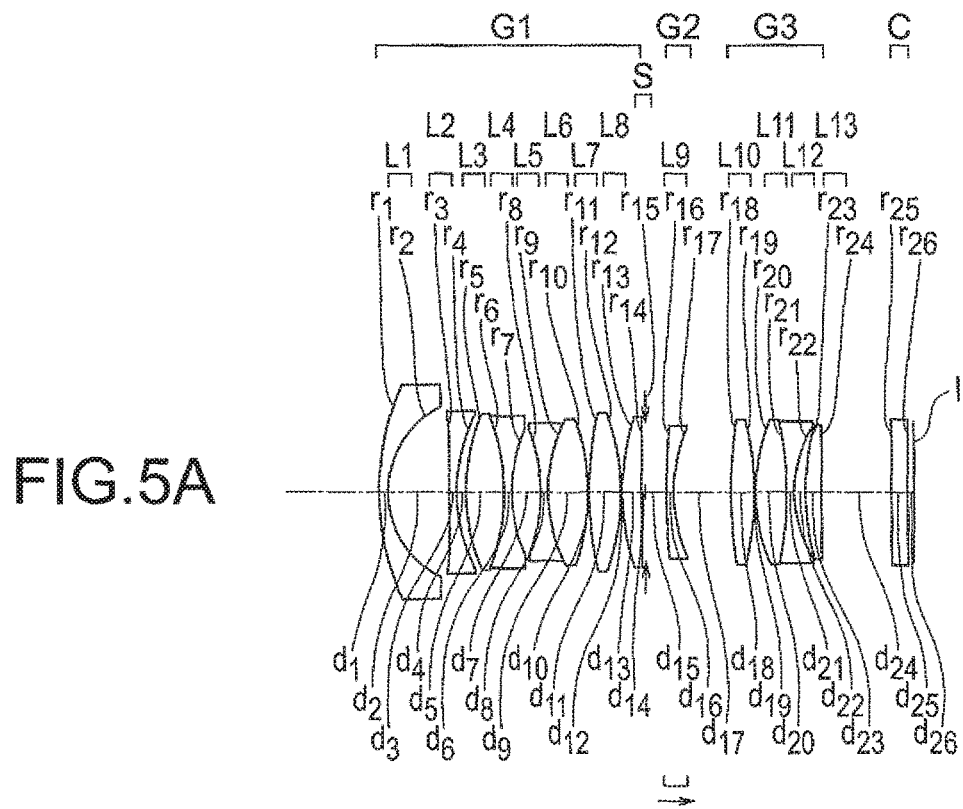
FIG. 5A, and FIG. 5B, FIG. 5C, FIG. 5D, and FIG. 5E are a cross-sectional view and aberration diagrams respectively, of a single-focus optical system according to an example 5.
Figures 5B, 5C, 5D, 5E:
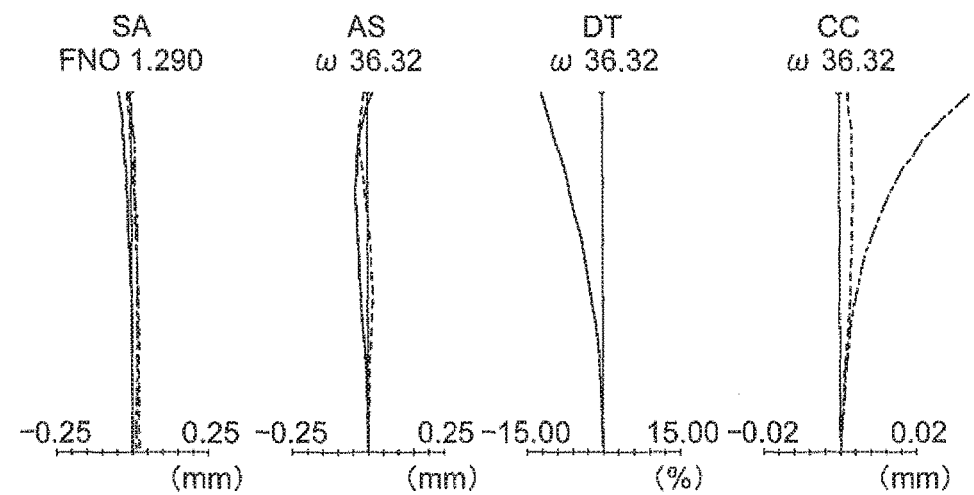
Figure 6A:
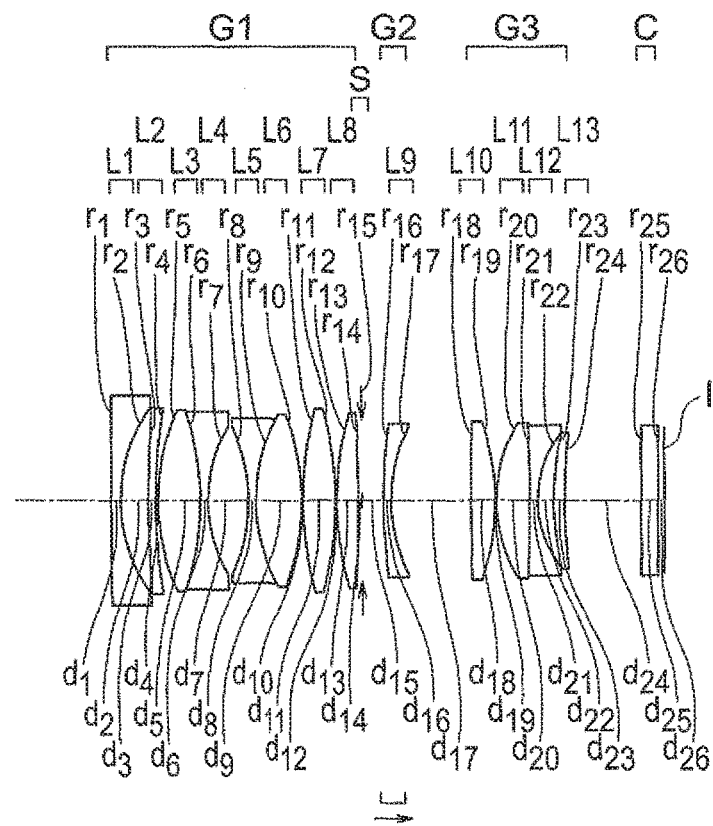
FIG. 6A, and FIG. 6B, FIG. 6C, FIG. 6D, and FIG. 6E are a cross-sectional view and aberration diagrams respectively, of a single-focus optical system according to an example 6.
Figures 6B, 6C, 6D, 6E:
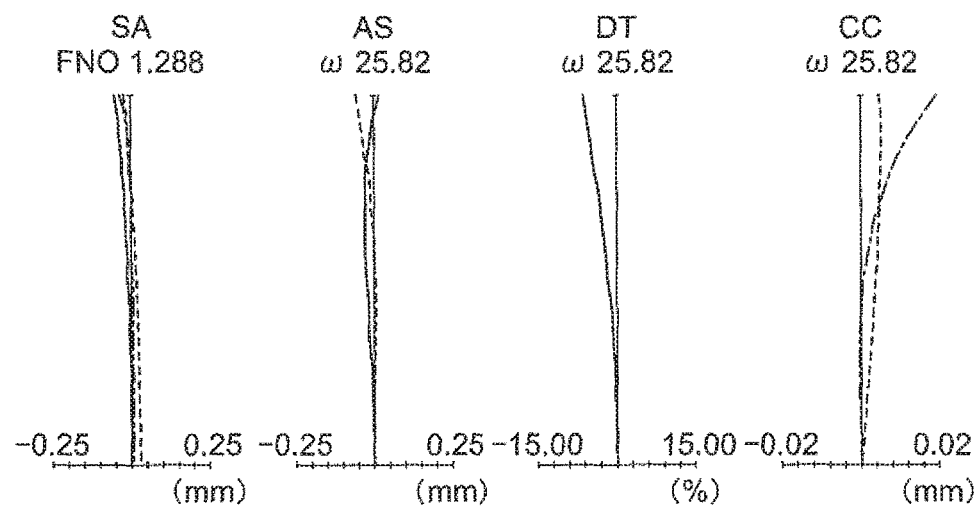
Figure 9A:
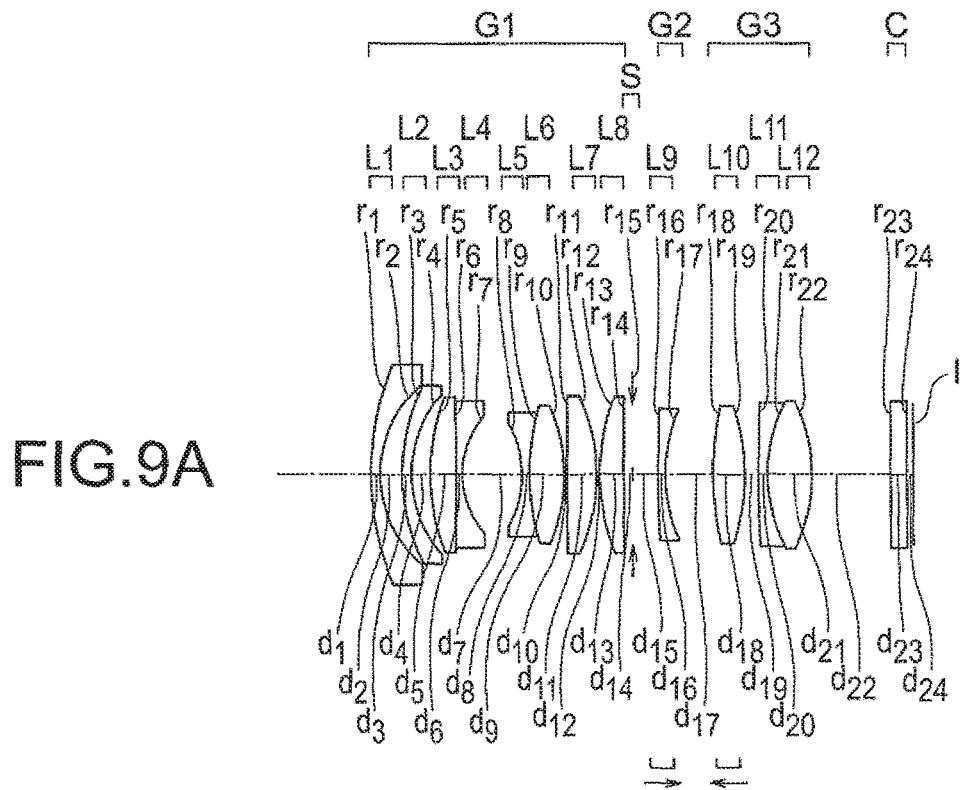
FIG. 9A, and FIG. 9B, FIG. 9C, FIG. 9D, and FIG. 9E are a cross-sectional view and aberration diagrams respectively, of a single-focus optical system according to an example 9.
Figures 9B, 9C, 9D, 9E:
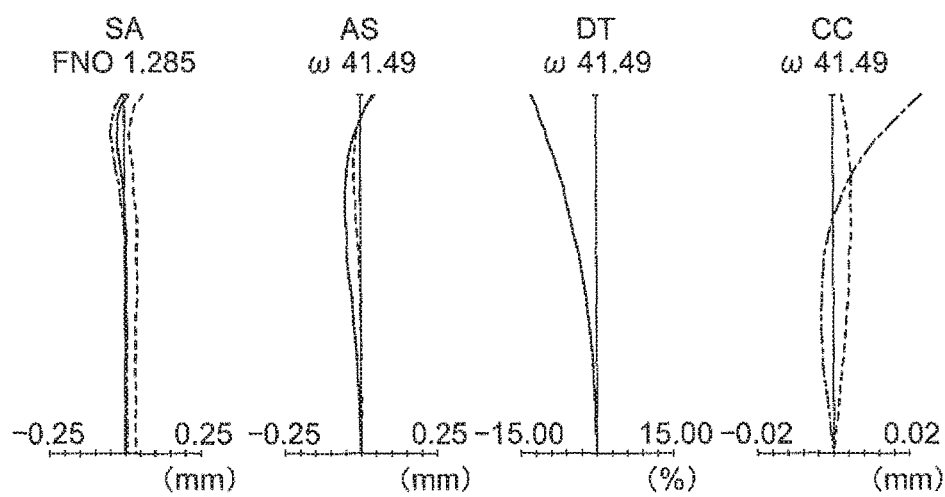
Figure 10A:
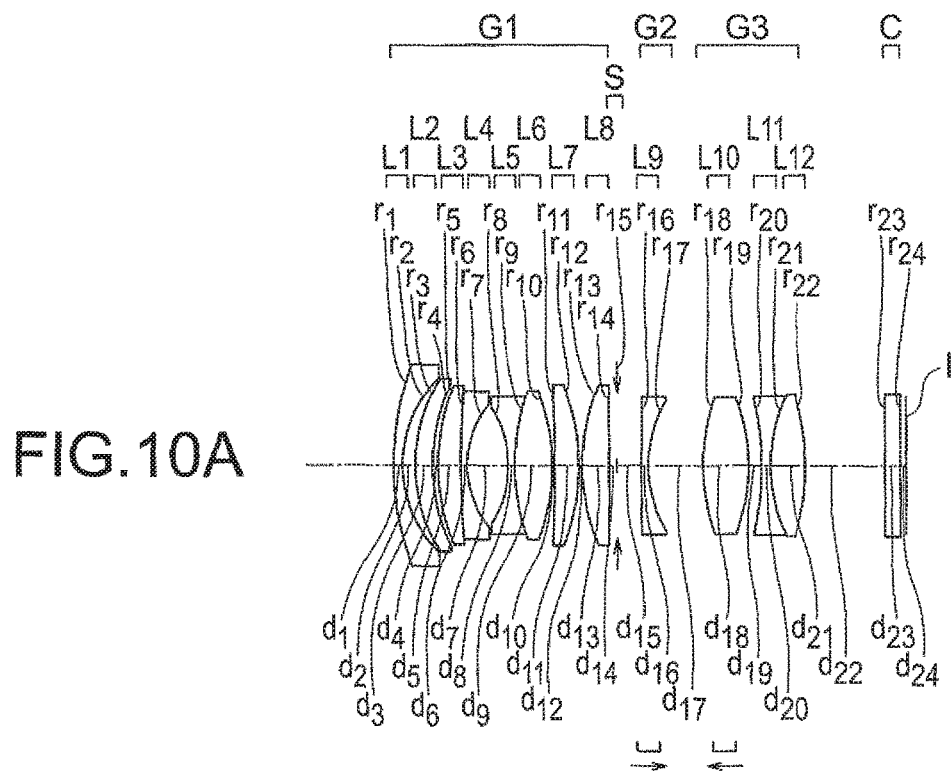
FIG. 10A, and FIG. 10B, FIG. 10C, FIG. 10D, and FIG. 10E are a cross-sectional view and aberration diagrams respectively, of a single-focus optical system according to an example 10.
Figures 10B, 10C, 10D, 10E:
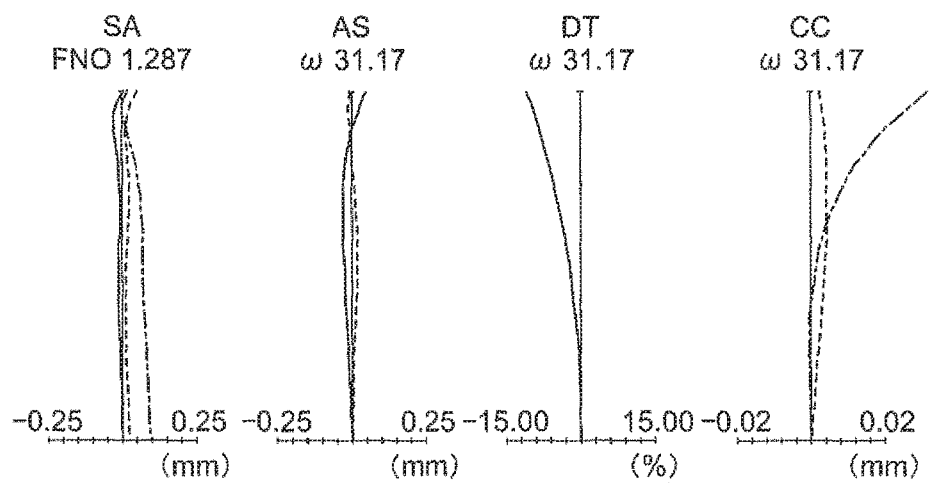
Figure 12A:
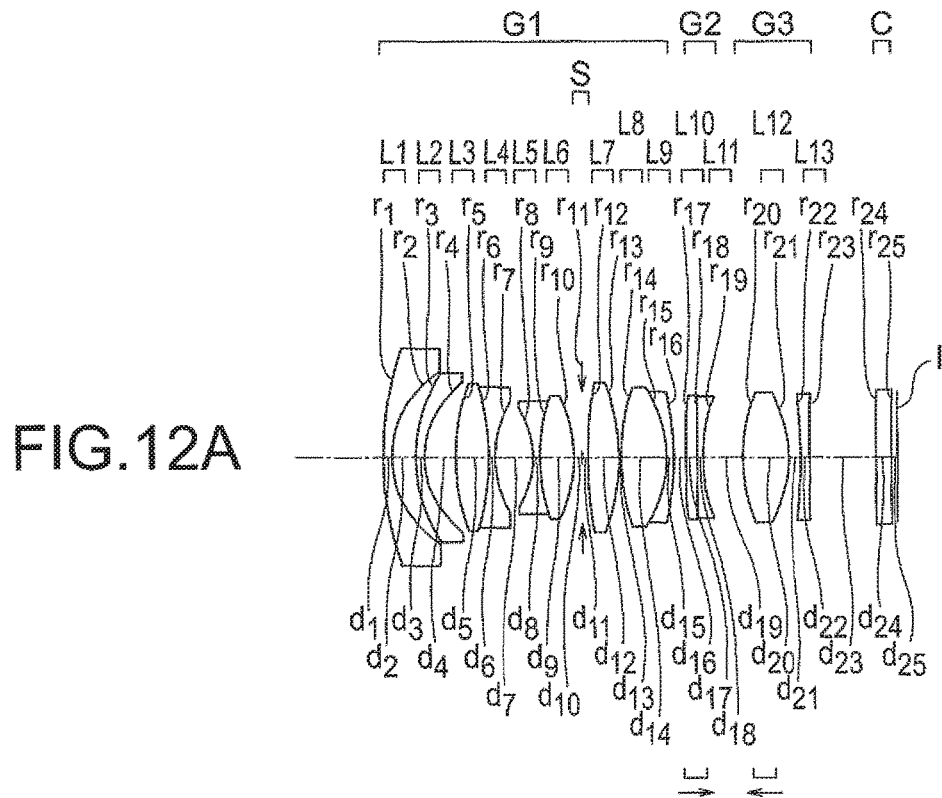
FIG. 12A, and FIG. 12B, FIG. 12C, FIG. 12D, and FIG. 12E are a cross-sectional view and aberration diagrams respectively, of a single-focus optical system according to an example 12.
Figures 12B, 12C, 12D, 12E:
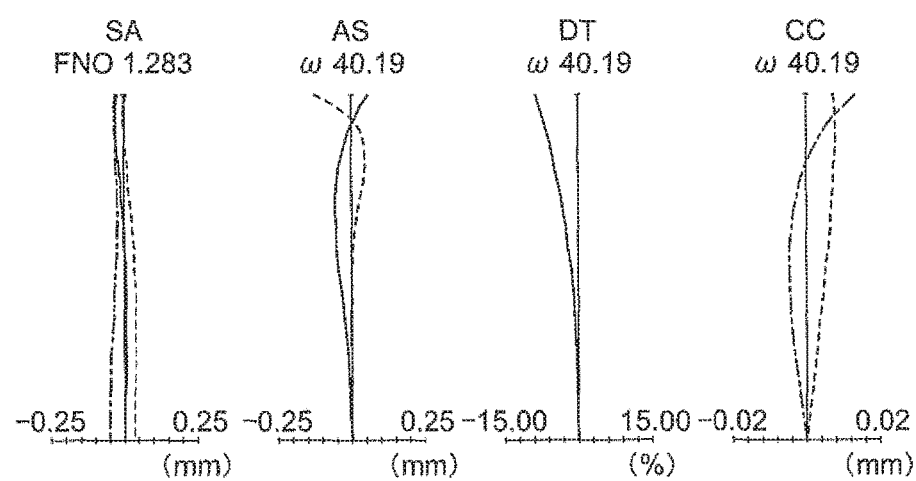

Embodiments and examples of a single-focus optical system and an optical apparatus using the same will be described below in detail by referring to the accompanying diagrams. However, the present invention is not restricted to the embodiments and the examples described below. The single-focus optical system means an optical system having a single focal length.

A single-focus optical system of the present embodiment is a single-focus optical system which forms a conjugate relationship between a conjugate point on an enlargement side at a long distance and a conjugate point on a reduction side at a short distance, and includes in order from the enlargement side, a first lens unit having a positive refractive power, a second lens unit having a negative refractive power, and a third lens unit having a positive refractive power. A lens component is one of a single lens and a cemented lens. The first lens unit includes in order from the enlargement side, either a first sub-unit, a second sub-unit, and a third sub-unit, or the first sub-unit, one positive lens component, the second sub-unit, and the third sub-unit. The first sub-unit includes one of a one negative lens component and a plurality of negative lens components that are continuous, the second sub-unit includes two meniscus lens components having respective concave surfaces thereof facing mutually, and the third sub-unit includes a plurality of positive lens components disposed closest to the reduction side in the third sub-unit. The plurality of positive lens components includes all positive lens components that are adjacent. The second lens unit includes one negative lens component, and the third lens unit includes a negative lens, and also includes a positive lens component closest to the enlargement side. All air spaces in the first lens unit are constant.

The single-focus optical system of the present embodiment will be described below while comparing the single-focus optical system of the present embodiment with a Gaussian type optical system. In the following description, the enlargement side corresponds to an object side, and the reduction side corresponds to an image side.

As mentioned above, a Gaussian type optical system has a high imaging performance. Therefore, by deforming the Gaussian type optical system, it is possible to make the aperture ratio further larger, and to make the angle of view further wider. Therefore, in the single-focus optical system of the present embodiment, an optical system which is deformed the Gaussian type optical system to be able to cope with further wider angle of view, is used.

The single-focus optical system of the present embodiment is based on a Gaussian type optical system. In other words, various ideas have been devised while maintaining a basic arrangement of lenses and shapes of lenses (hereinafter, referred to as the 'basic arrangement') in a Gaussian type as far as possible. Therefore, the single-focus optical system of the present embodiment has a basic arrangement similar to that of the object-side unit and the image-side unit in the Gaussian type.

However, in the single-focus optical system of the present embodiment, an arrangement of refractive power is let to be different from an arrangement of refractive power in the Gaussian type by shifting a balance of arrangement of refractive power, while maintaining as far as possible, a basic arrangement in the object-side unit in the Gaussian type and a basic arrangement in the image-side unit in the Gaussian type.

More specifically, in the single-focus optical system, with respect to a portion corresponding to the object-side unit, the positive refractive power in the object-side unit is made to be shifted to a negative side. Moreover, in the single-focus optical system, with respect to a portion corresponding to the image-side unit, the positive refractive power in the image-side unit is made to be shifted substantially to a positive side. The shift of the refractive power to the negative side refers to changing the positive refractive power to a weak negative refractive power, and changing the positive refractive power to even weaker positive refractive power. The shift of the refractive power to the positive side refers to changing the positive refractive power to even stronger positive refractive power.

In such manner, in the single-focus optical system of the present embodiment, an arrangement of the optical system is rearranged to be advantageous for aberration correction while maintaining the basic arrangement in the Gaussian type as far as possible. In other words, the basic arrangement in the Gaussian type is rearranged to shift a refractive power of a portion corresponding to the object-side unit in the Gaussian type, to the negative side, and to shift substantially the refractive power of a portion corresponding to the image-side unit in the Gaussian type to the positive side.

The first lens unit includes three sub-units. It is preferable not to shift substantially the refractive power of the portion corresponding to the object-side unit to the negative side while a focal length of the overall single-focus optical system is long. In view of such circumstances, in that case, one positive lens component may be disposed immediately before the second sub-unit, or in other words, between the second sub-unit and the first sub-unit including one or a plurality of negative lens components. By making such arrangement, it is possible to correct a spherical aberration and a longitudinal chromatic aberration favorably. However, disposing two or more positive lens components, by contrast, is not preferable, as the overall length of the optical system becomes long, and a diameter of the portion corresponding to the object-side unit becomes large.

On the other hand, in a case of shortening the focal length of the overall single-focus optical system, the positive lens component may not be disposed between the first sub-unit and the second sub-unit. By making such arrangement, it is possible to widen the angle of view.

The second sub-unit includes two meniscus lens components having respective concave surfaces thereof facing mutually. One of the meniscus lens components is disposed such that the concave surface thereof is directed toward the reduction side, and the other meniscus lens component is disposed such that the concave surface thereof is directed toward the enlargement side. Consequently, in the single-focus optical system of the present embodiment, since a portion on the enlargement side from one of the meniscus lens components becomes a portion corresponding to the object-side unit, the refractive power of this portion is shifted to the negative side. Moreover, since a portion on the reduction side from the other meniscus lens component becomes a portion corresponding to the image-side unit, the refractive power of this portion is shifted substantially to the positive side.

In an optical system having a large aperture ratio, in particular, the spherical aberration, the coma, and an astigmatism are strictly sought to be corrected favorably. Therefore, in the third lens unit, the positive lens component is disposed closest to the enlargement side. Since the second lens unit having a negative refractive power is positioned immediately before the third lens unit, it is possible to carry out an aberration correction mutually by the positive lens component and the second lens unit. As a result, it is possible to correct the spherical aberration, the coma, and the astigmatism as a whole, in a balanced manner. Moreover, since the negative lens component is disposed on the reduction side of the positive lens component, it becomes easy to carry out favorably the correction of the chromatic aberration of magnification in particular.

In such manner, in the single-focus optical system of the present embodiment, an arrangement in which, the refractive power of the portion corresponding to the object-side unit is shifted to the negative side and the refractive power of the portion corresponding to the image-side unit is shifted substantially to the positive side, has been adopted. Consequently, from a viewpoint of refractive power, the single-focus optical system of the present embodiment differs from the Gaussian type optical system.

However, the single-focus optical system of the present embodiment also, has the basic arrangement of the Gaussian type. Accordingly, the single-focus optical system of the present embodiment can be said to be based on an optical system in which the potential for aberration correction is extremely high. Consequently, in the single-focus optical system of the present embodiment, it is possible to correct particularly, a spherical aberration, a coma, a longitudinal chromatic aberration, and a chromatic aberration of magnification extremely favorably. As a result, it is possible to realize a single-focus optical system having an imaging performance higher than an imaging performance by the conventional Gaussian type optical system. For instance, in a single-focus optical system, it is possible to secure an F-number smaller than 1.4 and an angle of view not smaller than 50°.

In this way, according to the single-focus optical system of the present embodiment, it is possible to provide a single-focus optical system which has an F-number smaller than 1.4 in a category of lenses from a standard lens to a wide-angle lens, and has an extremely high potential for aberration correction. Particularly, regarding the imaging performance, it is possible to have imaging performance of a level far superior to that of a conventional single-focus optical system for a 35 mm film size.

Moreover, in the single-focus optical system of the present embodiment, it is preferable that a reduction-side surface of the negative lens component in the second lens unit be a concave surface, and a curvature of the reduction-side surface of the negative lens component in the second lens unit be larger than a curvature of an enlargement-side surface of the negative lens component in the second lens unit.

In an optical system having a large aperture ratio, the spherical aberration, the coma and the astigmatism in particular, are strictly sought to be corrected favorably. Therefore, by making such arrangement, it is possible to correct the spherical aberration, the coma, and the astigmatism in a balanced manner as a whole.

Moreover, in the single-focus optical system of the present embodiment, it is preferable that the third lens unit include a positive lens and a negative lens on the reduction side of the positive lens component in the third lens unit.

By the third lens unit including the positive lens, it is possible to make large a refractive power of a portion corresponding to an image-side unit in a Gaussian type. Moreover, in addition, by the third lens unit including the negative lens, it is possible to correct more favorably, the spherical aberration, the coma, the astigmatism, and the curvature of field, and in addition, the longitudinal chromatic aberration and the chromatic aberration of magnification, while enhancing the refractive power.

Moreover, in the single-focus optical system of the present embodiment, it is preferable that the third lens unit include a plurality of lenses on the reduction side of the positive lens component in the third lens unit, and the plurality of lenses include in order from the enlargement side, a positive lens, a negative lens, and a positive lens.

By making such arrangement, it is possible to correct more favorably, the spherical aberration, the coma, the astigmatism, and the curvature of field, and in addition, the longitudinal chromatic aberration and the chromatic aberration of magnification. Moreover, since it becomes easy to suppress an increase in a height of a light ray, it becomes easy to carry out the small-sizing of the optical system.

Moreover, in the single-focus optical system of the present embodiment, it is preferable that the third lens unit include a cemented lens on the reduction side of the positive lens component in the third lens unit, and the cemented lens include a positive lens and a negative lens.

By making such arrangement, it is possible to reduce a chromatic coma and a chromatic aberration of spherical aberration.

Moreover, in the single-focus optical system of the present embodiment, it is preferable that the second sub-unit include a cemented lens having a concave surface directed toward the enlargement side, and one of the two meniscus lens components be the cemented lens in the second sub-unit, and the cemented lens in the second sub-unit include in order from the enlargement side, a negative lens and a positive lens.

By making such arrangement, it is possible to correct favorably, the spherical aberration, the coma, an astigmatism, and the curvature of field, and in addition, the longitudinal chromatic aberration and the chromatic aberration of magnification.

Moreover, in the single-focus optical system of the present embodiment, it is preferable that the second sub-unit include a cemented lens having a concave surface directed toward the enlargement side and a reduction-side lens component, and one of the two meniscus lens components be the cemented lens in the second sub-unit, and the other of the two meniscus lens components be the reduction-side lens component, and the cemented lens in the second sub-unit include in order from the enlargement side, a negative lens and a positive lens, and the reduction-side lens component be disposed on the enlargement side of the cemented lens in the second sub-unit, adjacent to the cemented lens in the second sub-unit, and a shape of the reduction-side lens component be a meniscus shape having a convex surface directed toward the enlargement side.

By making such arrangement, even in a case in which the aperture ratio is made further larger, and the angle of view is widened further, it is possible to correct favorably the spherical aberration, the coma, the astigmatism, and a curvature of field, and in addition, the longitudinal chromatic aberration and the chromatic aberration of magnification.

Moreover, in the single-focus optical system of the present embodiment, it is preferable that a shape of the negative lens component in the second lens unit be a meniscus shape having a concave surface directed toward the reduction side, and the negative lens component in the second lens unit move on an optical axis for focusing.

By letting the shape of the negative lens component in the second lens unit to be the meniscus shape having a concave surface directed toward the reduction side, it is possible to make a fluctuation in the spherical aberration to be the least. Consequently, even when the second lens unit is moved for focusing, it is possible to minimize the fluctuation in the spherical aberration.

Moreover, in the single-focus optical system of the present embodiment, it is preferable that only the positive lens component in the third lens unit be moved together with the second lens unit for focusing, while changing a distance between the second lens unit and the positive lens component in the third lens unit.

By moving the second lens unit at the time of focusing, each aberration fluctuates. In a case in which an amount of fluctuation in each aberration is large beyond an accepted value, it is preferable to move only the positive lens component in the third lens unit together with the second lens unit on the optical axis, while changing a distance between the positive lens component in the third lens unit and the second lens unit. Accordingly, it is possible suppress a fluctuation in the spherical aberration and a fluctuation in the astigmatism.

Moreover, in the single-focus optical system of the present embodiment, it is preferable that the first lens unit include an enlargement-side lens component closest to the enlargement side, and the following conditional expression (1) be satisfied:

$$0.75 < SF_{11} < 3.5 \quad (1)$$

where, $SF_{11} = (R_{F11} + R_{R11})/(R_{F11} - R_{R11})$, and here $R_{F11}$ denotes a radius of curvature of an enlargement-side surface of the enlargement-side lens component, and $R_{R11}$ denotes a radius of curvature of a reduction-side surface of the enlargement-side lens component.

By making so as not to exceed an upper limit value of conditional expression (1), in particular, correction of the astigmatism becomes easy. By making so as not to fall below a lower limit value of conditional expression (1), in particular, correction of a barrel distortion becomes easy.

Here, it is more preferable that the following conditional expression (1') be satisfied instead of conditional expression (1).

$$0.85 < SF_{11} < 3.0 \quad (1')$$

Moreover, it is even more preferable that the following conditional expression (1") be satisfied instead of conditional expression (1).

$$0.95 < SF_{11} < 2.7 \quad (1'')$$

Moreover, in the single-focus optical system of the present embodiment, it is preferable that the second sub-unit include a reduction-side lens component, and the reduction-side lens component be a meniscus lens component positioned on the enlargement side of the two meniscus lens components, and the following conditional expression (2) be satisfied:

$$1.4 < SF_{12} < 15 \quad (2)$$

where, $SF_{12} = (R_{F12} + R_{R12})/(R_{F12} - R_{R12})$, and here $R_{F12}$ denotes a radius of curvature of an enlargement-side surface of the reduction-side lens component, and $R_{R12}$ denotes a radius of curvature of a reduction-side surface of the reduction-side lens component.

By making so as not to exceed either an upper limit value of conditional expression (2), or so as not to fall below a lower limit value of conditional expression (2), it becomes easy to correct the spherical aberration and the coma in a balanced manner even when the aperture ratio is made large as well as the angle of view is widened.

Here, it is more preferable that the following conditional expression (2') be satisfied instead of conditional expression (2).

$$1.6 < SF_{12} < 10 \quad (2')$$

Moreover, it is even more preferable that the following conditional expression (2") be satisfied instead of conditional expression (2).

$$1.8 < SF_{12} < 8.0 \quad (2'')$$

Moreover, in the single-focus optical system of the present embodiment, it is preferable that the second sub-unit include a cemented lens, and the cemented lens in the second sub-unit be a meniscus lens component positioned on the reduction side of the two meniscus lens components, and the following conditional expression (3) be satisfied:

$$-15 < SF_{13} < -2.0 \quad (3)$$

where, $SF_{13} = (R_{F13} + R_{R13})/(R_{F13} - R_{R13})$, and here $R_{F13}$ denotes a radius of curvature of an enlargement-side surface of the cemented lens in the second sub-unit, and $R_{R13}$ denotes a radius of curvature of a reduction-side surface of the cemented lens in the second sub-unit.

By making so as not to exceed either an upper limit value of conditional expression (3), or so as not to fall below a lower limit value of conditional expression (3), it becomes easy to correct the spherical aberration and the coma in a balanced manner even when the aperture ratio is made large as well as the angle of view is widened.

Here, it is more preferable that the following conditional expression (3') be satisfied instead of conditional expression (3).

$$-12 < SF_{13} < -2.5 \tag{3'}$$

Moreover, it is even more preferable that the following conditional expression (3") be satisfied instead of conditional expression (3).

$$-10 < SF_{13} < -3.0 \tag{3"}$$

Moreover, in the single-focus optical system of the present embodiment, it is preferable that the plurality of positive lens components in the third sub-unit include all positive lens components that are adjacent on the reduction side in the third sub-unit, and the plurality of positive lens components include a front positive lens component positioned closest to the enlargement side, and a rear positive lens component positioned closest to the reduction side, and the following conditional expression (4) be satisfied:

$$0.10 < SF_{14} - SF_{15} < 7.0 \tag{4}$$

where, $$SF_{14} = (R_{F14} + R_{R14})/(R_{F14} - R_{R14}),$$

$$SF_{15} = (R_{F15} + R_{R15})/(R_{F15} - R_{R15}), \text{ and here}$$

$R_{F14}$ denotes a radius of curvature of an enlargement-side surface of the front positive lens component, $R_{R14}$ denotes a radius of curvature of a reduction-side surface of the front positive lens component, $R_{F15}$ denotes a radius of curvature of an enlargement-side surface of the rear positive lens component, and $R_{R15}$ denotes a radius of curvature of a reduction-side surface of the rear positive lens component.

In the third sub-unit, at positions where the plurality of positive lens components is disposed, a height of an axial light ray is high. Consequently, a shape of each lens component in the plurality of positive lens components has a close connection with the correction of the spherical aberration which has an effect on a sharpness of an overall image.

Moreover, an axial light beam is in a diverged state at the enlargement side of the third sub-unit. In the third sub-unit, for turning the diverged state to a converged state, it is preferable to arrange each positive lens component such that a shaping factor of each positive lens component assumes a negative direction from the enlargement side to the reduction side. Moreover, it is necessary that a difference in the shaping factor of the positive lens components positioned at two ends out of the plurality of positive lens components assumes an appropriate value.

By making so as not to exceed either an upper limit value of conditional expression (4), or so as not to fall below a lower limit value of conditional expression (4), the correction of the spherical aberration becomes easy even when the aperture ratio is made large as well as the angle of view is widened.

Here, it is more preferable that the following conditional expression (4') be satisfied instead of conditional expression (4).

$$0.30 < S_{F14} - S_{F15} < 6.0 \tag{4'}$$

Moreover, it is even more preferable that the following conditional expression (4") be satisfied instead of conditional expression (4).

$$0.45 < SF_{14} - SF_{15} < 5.5 \tag{4"}$$

Moreover, in the single-focus optical system of the present embodiment, it is preferable that the following conditional expression (5) be satisfied:

$$0.80 < SF_{21} < 4.0 \tag{5}$$

where, $$SF_{21} = (R_{F21} + R_{R21})/(R_{F21} - R_{R21}), \text{ and here}$$

$R_{F21}$ denotes a radius of curvature of an enlargement-side surface of the negative lens component in the second lens unit, and $R_{R21}$ denotes a radius of curvature of a reduction-side surface of the negative lens component in the second lens unit.

In a case of using the inner focusing, the fluctuation in aberration becomes a problem. In the inner focusing, when the second lens unit is let to be a unit that moves on the optical axis, it is possible to minimize the fluctuation in aberration. Therefore, it is possible to carry out stable focusing. Furthermore, by satisfying conditional expression (5), it is possible to suppress adequately the fluctuation in aberration.

By making so as not to exceed an upper limit value of conditional expression (5), it is possible to suppress an increase in the fluctuation of astigmatism. By making so as not to fall below a lower limit value of conditional expression (5), it is possible to suppress the fluctuation in the spherical aberration.

Here, it is more preferable that the following conditional expression (5') be satisfied instead of conditional expression (5).

$$0.85 < SF_{21} < 3.0 \tag{5'}$$

Moreover, it is even more preferable that the following conditional expression (5") be satisfied instead of conditional expression (5).

$$0.90 < SF_{21} < 2.5 \tag{5"}$$

Moreover, in the single-focus optical system of the present embodiment, it is preferable that the following conditional expression (6) be satisfied:

$$-0.4 < SF_{31} < 1.6 \tag{6}$$

where, $$SF_{31} = (R_{F31} + R_{R31})/(R_{F31} - R_{R31}), \text{ and here}$$

$R_{F31}$ denotes a radius of curvature of an enlargement-side surface of the positive lens component in the third lens unit, and $R_{R31}$ denotes a radius of curvature of a reduction-side surface of the positive lens component in the third lens unit.

For small-sizing and light-weighting of the optical system, it is preferable to reduce the number of lens components in the optical system. However, as the number of lens components is reduced, in a case in which only the second lens unit is moved for inner focusing, sometimes the fluctuation in aberration cannot be suppressed adequately even when the abovementioned conditional expression (5) is satisfied. In such case, it is preferable to move the positive lens component in the third lens unit while changing a relative distance with the second lens unit. Moreover, in that case, it is preferable to satisfy conditional expression (6).

By making so as not to exceed an upper limit value of conditional expression (6), it is possible to suppress an increase in the fluctuation of the spherical aberration. By making so as not to fall below a lower limit value of conditional expression (6), it is possible to suppress an increase in the fluctuation of the astigmatism.

Here, it is more preferable that the following conditional expression (6') be satisfied instead of conditional expression (6).

$$-0.2 < SF_{31} < 1.3 \quad (6')$$

Moreover, it is even more preferable that the following conditional expression (6") be satisfied instead of conditional expression (6).

$$0 < SF_{31} < 1.1 \quad (6'')$$

Moreover, in the single-focus optical system of the present embodiment, it is preferable that the first lens unit include a reduction-side positive lens component closest to the reduction side, and the reduction-side positive lens component be a single lens, and in a rectangular coordinate system in which a horizontal axis is let to be $Nd_{1PR}$ and a vertical axis is let to be $vd_{1PR}$, when a straight line represented by $Nd_{1PR}=\alpha \times vd_{1PR}+\beta_{1PR}$, where, $\alpha=-0.01$, $Nd_{1PR}$ and $vd_{1PR}$ for the reduction-side positive lens component be included in both of an area determined by a straight line when a lower limit value of a range of the following conditional expression (11) is $\beta_{1PR}=2.25$, and an area determined by the following conditional expressions (12) and (13):

$$2.25 \leq \beta_{1PR} \quad (11),$$

$$1.40 < Nd_{1PR} \quad (12), \text{ and}$$

$$35 < vd_{1PR} \quad (13)$$

where, $Nd_{1PR}$ denotes a refractive index of the reduction-side positive lens component, and $vd_{1PR}$ denotes Abbe number for the reduction-side positive lens component.

In the first lens unit, at positions where the plurality of positive lens components is disposed, the height of the axial light ray is high. Consequently, in the plurality of positive lens components, particularly a chromatic aberration such as the longitudinal chromatic aberration and the spherical aberration is susceptible to occur.

The reduction-side lens component is disposed closest to the reduction side in the first lens unit. This position is a position which is farthest away from the cemented lens in the first lens unit.

For small-sizing and light-weighting of the first lens unit, it is preferable to include a single lens in the reduction-side positive lens component. However, at the position where the reduction-side positive lens component is disposed, the chromatic aberration is susceptible to occur as mentioned above. Therefore, in a case of including a single lens in the reduction-side positive lens component, an arrangement is to be made such that the refractive index and Abbe number for the reduction-side positive lens component is included in the area determined by conditional expressions (11), (12), and (13). By making such arrangement, it is possible to suppress an occurrence of a chromatic aberration such as the longitudinal chromatic aberration and the spherical aberration.

Moreover, in the single-focus optical system of the present embodiment, it is preferable that the negative lens component in the second lens unit be a single lens, and in a rectangular coordinate system in which a horizontal axis is let to be $Nd_{2NF}$ and a vertical axis is let to be $vd_{2NF}$, when a straight lien represented by $Nd_{2NF}=\alpha \times vd_{2NF}+\beta_{2NF}$, where, $\alpha=-0.01$, $Nd_{2NF}$ and $vd_{2NF}$ for the negative lens component in the second lens unit be included in both of an area determined by a straight line when a lower limit value of a range of the following conditional expression (14) is $\beta 2NF=2.15$, and an area determined by the following conditional expressions (15) and (16):

$$2.15 \leq \beta_{2NF} \quad (14),$$

$$1.45 < Nd_{2NF} \quad (15), \text{ and}$$

$$25 < vd_{2NF} \quad (16)$$

where, $Nd_{2NF}$ denotes a refractive index of the negative lens component in the second lens unit, and $vd_{2NF}$ denotes Abbe number for the negative lens component in the second lens unit.

In a case of moving the second lens unit at the time of focusing, the fluctuation in the chromatic aberration is desired to be small. An arrangement is to be made such that the refractive index and Abbe number for the negative lens component in the second lens unit is included in an area determined by conditional expressions (14), (15), and (16). By making such arrangement, it is possible to suppress an occurrence of a chromatic aberration such as the longitudinal chromatic aberration, the chromatic aberration of magnification, the spherical aberration, or a chromatic coma.

Moreover, in the single-focus optical system of the present embodiment, it is preferable that the first lens unit include an enlargement-side lens component closest to the enlargement side, and the following conditional expression (A) be satisfied:

$$0 < f/e_{N1F} < 2 \quad (A)$$

where, f denotes the focal length of the overall single-focus optical system at the time of focusing to an object at infinity, and $e_{N1F}$ denotes a maximum effective aperture of the enlargement-side lens component in the first lens unit.

In a case of exceeding an upper limit value of conditional expression (A), it becomes difficult to widen the angle of view. In other words, when an attempt is made to widen the angle of view, the spherical aberration, the distortion, and the astigmatism are susceptible to occur. On the other hand, In a case of falling below a lower limit value of conditional expression (A), the optical system is susceptible to become large-sized in a radial direction.

Here, it is preferable that the following conditional expression (A') be satisfied instead of conditional expression (A).

$$0.1 < f/e_{N1F} < 1.5 \quad (A')$$

Moreover, it is even more preferable that the following conditional expression (A") be satisfied instead of conditional expression (A).

$$0.2 < f/e_{N1F} < 1 \quad (A'')$$

Moreover, it is preferable that the single-focus optical system of the present embodiment include an aperture stop, and the following conditional expression (B) be satisfied:

$$0 < (f/e_{AS})/Fno < 2 \quad (B)$$

where, f denotes the focal length of the overall single-focus optical system at the time of focusing to an object at infinity, $e_{AS}$ denotes a maximum diameter of the aperture stop, and Fno denotes an F-number for the overall single-focus optical system at the time of focusing to an object at infinity.

In a case of exceeding upper limit value of conditional expression (B), it becomes difficult to widen the angle of view. In other words, when an attempt is made to widen the angle of view, correction of the spherical aberration and the chromatic aberration becomes difficult. Whereas, In a case of falling below a lower limit value of conditional expression (B), the optical system is susceptible to become large-sized in the radial direction.

Here, it is more preferable that the following conditional expression (B') be satisfied instead of conditional expression (B).

$$0.2<(f/e_{AS})/Fno<1 \qquad (B')$$

Moreover, it is more preferable that the following conditional expression (B") be satisfied instead of conditional expression (B).

$$0.3<(f/e_{AS})/Fno<0.9 \qquad (B'')$$

Moreover, in the single-focus optical system of the present embodiment, it is preferable that the following conditional expression (C) be satisfied:

$$0<T_{air\_max}/\Sigma d \leq 0.27 \qquad (C)$$

where, $T_{air\_max}$ is a largest axial air space in the range from a surface positioned closest to the enlargement side to a surface positioned closest to the reduction side in the single-focus optical system, and $\Sigma d$ is an axial distance from the surface positioned closest to the enlargement side to the surface positioned closest to the reduction side in the single-focus optical system.

Conditional expression (C) is a conditional expression which is advantageous for securing a high optical performance, shortening the overall length of the optical system, and making small an outer diameter of the image forming optical system.

Widening appropriately an air space between the lenses leads to an improvement in an optical performance. However, securing an optical performance by widening excessively the air space between the lenses with respect to $\Sigma d$, that is, the axial distance from the lens surface positioned closest to the enlargement side up to a lens surface positioned closest to the reduction side of the single-focus optical system, may lead to an increase in the overall length of the optical system and making an aperture of the optical system large.

Therefore, satisfying conditional expression (C) is advantageous for securing the number of lenses necessary for realizing a high optical performance while shortening the overall length of the optical system, and making the aperture small.

Here, it is more preferable that the following conditional expression (C') be satisfied instead of conditional expression (C).

$$0.03<T_{air\_max}/\Sigma d \leq 0.2 \qquad (C')$$

Moreover, it is even more preferable that the following conditional expression (C") be satisfied instead of conditional expression (C).

$$0.07<T_{air\_max}/\Sigma d \leq 0.18 \qquad (C'')$$

Moreover, an optical apparatus of the present embodiment includes an optical system and an image pickup element which is disposed on a reduction side. The image pickup element has an image pickup surface, and converts an image formed on the image pickup surface by the optical system to an electric signal, and the optical system is the abovementioned single-focus optical system.

According to the optical apparatus of the present embodiment, it is possible to pick up an image with a wide photographing range, a low noise, and a high resolution.

Moreover, an optical apparatus of the present embodiment includes an optical system, and a display element which is disposed on the reduction side. The display element has a display surface, and an image displayed on the display surface is projected on the enlargement side by the optical system, and the optical system is the abovementioned single-focus optical system.

According to the optical apparatus of the present embodiment, it is possible to project an image with a wide projection range, a low noise, and a high resolution.

The abovementioned single-focus optical system and the optical apparatus may satisfy a plurality of arrangements simultaneously. Making such arrangement is preferable for achieving a favorable single-focus optical system and optical apparatus. Moreover, combinations of preferable arrangements are arbitrary. For each conditional expression, only the upper limit value or the lower limit value of a numerical range of a conditional expression further restricted, may be limited.

Examples of the single-focus optical system will be described below in detail by referring to the accompanying diagrams. However, the present invention is not restricted to the examples described below.

Examples 1 to 12 of the single-focus optical system will be described below by referring to the accompanying diagrams. Each of single-focus optical systems in examples 1 to 12 is a single-focus optical system with an F-number less than 1.5.

FIG. 1A, FIG. 2A, FIG. 3A, FIG. 4A, FIG. 5A, FIG. 6A, FIG. 7A, FIG. 8A, FIG. 9A, FIG. 10A, FIG. 11A, and FIG. 12A show lens cross-sectional views for the single-focus optical systems of the examples. The lens cross-sectional views are lens cross-sectional views at the time of focusing to an object at infinity.

FIG. 1B, FIG. 2B, FIG. 3B, FIG. 4B, FIG. 5B, FIG. 6B, FIG. 7B, FIG. 8B, FIG. 9B, FIG. 10B, FIG. 11B, and FIG. 12B show a spherical aberration (SA) in the single-focus optical systems of the examples.

FIG. 1C, FIG. 2C, FIG. 3C, FIG. 4C, FIG. 5C, FIG. 6C, FIG. 7C, FIG. 8C, FIG. 9C, FIG. 10C, FIG. 11C, and FIG. 12C show an astigmatism (AS) in the single-focus optical systems of the examples.

FIG. 1D, FIG. 2D, FIG. 3D, FIG. 4D, FIG. 5D, FIG. 6D, FIG. 7D, FIG. 8D, FIG. 9D, FIG. 10D, FIG. 11D, and FIG. 12D show a distortion (DT) in the single-focus optical systems of the examples.

FIG. 1E, FIG. 2E, FIG. 3E, FIG. 4E, FIG. 5E, FIG. 6E, FIG. 7E, FIG. 8E, FIG. 9E, FIG. 10E, FIG. 11E, and FIG. 12E show a chromatic aberration of magnification in the single-focus optical systems of the examples. Each aberration diagram is an aberration diagram at the time of focusing to an object at infinity. Moreover, ω denotes a half angle of view.

Moreover, in the lens cross-sectional view of each example, a first lens unit is denoted by G1, a second lens unit is denoted by G2, a third lens unit is denoted by G3, a cover glass is denoted by C, and an image plane is denoted by I.

Although it is not shown in the diagrams, a plane parallel plate which forms a low-pass filter may be disposed between the third lens unit G3 and the image plane I. A wavelength-region restricting coating which restricts infra-red rays may be applied to a surface of the plane parallel plate. Moreover, a multilayer film for wavelength-region restriction may be applied to a surface of the cover glass. Furthermore, the cover glass C may be imparted with an effect of a low-pass filter.

Moreover, in a case of using the single-focus optical system for image pickup, an image pickup element is disposed on the image plane I. Whereas, in a case of using the single-focus optical system for projection, a display element is disposed on the image plane I. In the description of an arrangement of each example, the description will be made assuming that the single-focus optical system is used for image pickup. Therefore, the enlargement side will be let to be an object side, and the reduction side will be let to be an image side.

A single-focus optical system according to an example 1 will be described below.

The single-focus optical system according to the example 1 includes in order from an object side, a first lens unit G1 having a positive refractive power, a second lens unit G2 having a negative refractive power, and a third lens unit G3 having a positive refractive power. The first lens unit G1 includes an aperture stop S.

The first lens unit G1 includes a first sub-unit, a second sub-unit, and a third sub-unit. The first sub-unit includes a negative meniscus lens L1 having a convex surface directed toward an object side. The second sub-unit includes a biconvex positive lens L2, a biconcave negative lens L3, a biconcave negative lens L4, and a biconvex positive lens L5. The third sub-unit includes a positive meniscus lens L6 having a convex surface directed toward an image side, a biconvex positive lens L7, and a biconvex positive lens L8. Here, the biconvex positive lens L2 and the biconcave negative lens L3 are cemented. Moreover, the biconcave negative lens L4 and the biconvex positive lens L5 are cemented.

The second lens unit G2 includes a negative meniscus lens L9 having a convex surface directed toward the object side.

The third lens unit G3 includes a biconvex positive lens L10, a biconvex positive lens L11 and a negative meniscus lens L12 having a convex surface directed toward the object side.

Moreover, at the time of focusing from an object at infinity to an object at a close distance, the negative meniscus lens L9 moves toward the image side along an optical axis.

An aspherical surface is provided to a total of five surfaces which are, an object-side surface of the negative meniscus lens L1, an image-side surface of the biconcave negative lens L3, both surfaces of the negative meniscus lens L9, and an image-side surface of the biconvex positive lens L10.

Next, a single-focus optical system according to an example 2 will be described below.

The single-focus optical system according to the example 2 includes in order from an object side, a first lens unit G1 having a positive refractive power, a second lens unit G2 having a negative refractive power, and a third lens unit G3 having a positive refractive power. The first lens unit G1 includes an aperture stop S.

The first lens unit G1 includes a first sub-unit, a second sub-unit, and a third sub-unit. The first sub-unit includes a negative meniscus lens L1 having a convex surface directed toward the object side. The second sub-unit includes a biconvex positive lens L2, a biconcave negative lens L3, a biconcave negative lens L4, and a biconvex positive lens L5. The third sub-unit includes a biconvex positive lens L6, a biconvex positive lens L7, and a positive meniscus lens L8 having a convex surface directed toward the object side. Here, the biconvex positive lens L2 and the biconcave negative lens L3 are cemented. Moreover, the biconcave negative lens L4 and the biconvex positive lens L5 are cemented.

The second lens unit G2 includes a negative meniscus lens L9 having a convex surface directed toward the object side.

The third lens unit G3 includes a biconvex positive lens L10, a biconvex positive lens L11 and a negative meniscus lens L12 having a convex surface directed toward an image side.

Moreover, at the time of focusing from an object at infinity to an object at a close distance, the negative meniscus lens L9 moves toward the image side along an optical axis.

An aspherical surface is provided to a total of four surfaces which are, both surfaces of the negative meniscus lens L1 and both surfaces of the negative meniscus lens L9.

Next, a single-focus optical system according to an example 3 will be described below.

The single-focus optical system according to the example 3 includes in order from an object side, a first lens unit G1 having a positive refractive power, a second lens unit G2 having a negative refractive power, and a third lens unit G3 having a positive refractive power. The first lens unit G1 includes an aperture stop S.

The first lens unit G1 includes a first sub-unit, a second sub-unit, and a third sub-unit. The first sub-unit includes a negative meniscus lens L1 having a convex surface directed toward the object side. The second sub-unit includes a negative meniscus lens L2 having a convex surface directed toward the object side, a biconvex positive lens L3, a biconcave negative lens L4, a biconcave negative lens L5, and a biconvex positive lens L6. The third sub-unit includes a positive meniscus lens L7 having a convex surface directed toward an image side, a biconvex positive lens L8, and a positive meniscus lens L9 having a convex surface directed toward the object side. Here, the negative meniscus lens L2, the biconvex positive lens L3, and the biconcave negative lens L4 are cemented. Moreover, the biconcave negative lens L5 and the biconvex positive lens L6 are cemented.

The second lens unit G2 includes a negative meniscus lens L10 having a convex surface directed toward the object side.

The third lens unit G3 includes a biconvex positive lens L11, a biconvex positive lens L12, a biconvex positive lens L13, and a negative meniscus lens L14 having a convex surface directed toward the image side.

Moreover, at the time of focusing from an object at infinity to an object at a close distance, the negative meniscus lens L10 moves toward the image side along an optical axis.

An aspherical surface is provided to a total of three surfaces which are, an object-side surface of the negative meniscus lens L2, and both surfaces of the negative meniscus lens L10.

Next, a single-focus optical system according to an example 4 will be described below.

The single-focus optical system according to the example 4 includes in order from an object side, a first lens unit G1 having a positive refractive power, a second lens unit G2 having a negative refractive power, and a third lens unit G3 having a positive refractive power. The first lens unit G1 includes an aperture stop S.

The first lens unit G1 includes a first sub-unit, a second sub-unit, and a third sub-unit. The first sub-unit includes a negative meniscus lens L1 having a convex surface directed toward the object side and a negative meniscus lens L2 having a convex surface directed toward the object side. The second sub-unit includes a biconvex positive lens L3, a biconcave negative lens L4, a biconcave negative lens L5, and a biconvex positive lens L6. The third sub-unit includes a biconvex positive lens L7 and a positive meniscus lens L8 having a convex surface directed toward the object side. Here, the biconvex positive lens L3 and the biconcave negative lens L4 are cemented. Moreover, the biconcave negative lens L5 and the biconvex positive lens L6 are cemented.

The second lens unit G2 includes a negative meniscus lens L9 having a convex surface directed toward the object side.

The third lens unit G3 includes a biconvex positive lens L10, a biconvex positive lens L11, a biconcave negative lens L12, and a positive meniscus lens L13 having a convex surface directed toward the object side. Here, the biconvex positive lens L11 and the biconcave negative lens L12 are cemented.

Moreover, at the time of focusing from an object at infinity to an object at a close distance, the negative meniscus lens L9 moves toward an image side along an optical axis.

An aspherical surface is provided to a total of four surfaces which are, both surfaces of the negative meniscus lens L2 and both surfaces of the negative meniscus les L9.

Next, a single-focus optical system according to an example 5 will be described below.

The single-focus optical system according to the example 5 includes in order from an object side, a first lens unit G1 having a positive refractive power, a second lens unit G2 having a negative refractive power, and a third lens unit G3 having a positive refractive power. The first lens unit G1 includes an aperture stop S.

The first lens unit G1 includes a first sub-unit, a second sub-unit, and a third sub-unit. The first sub-unit includes a negative meniscus lens L1 having a convex surface directed toward the object side and a negative meniscus lens L2 having a convex surface directed toward the object side. The second sub-unit includes a biconvex positive lens L3, a biconcave negative lens L4, a biconcave negative lens L5, and a biconvex positive lens L6. The third sub-unit includes a biconvex positive lens L7 and a positive meniscus lens L8 having a convex surface directed toward the object side. Here, the biconvex positive lens L3 and the biconcave negative lens L4 are cemented. Moreover, the biconcave negative lens L5 and the biconvex positive lens L6 are cemented.

The second lens unit G2 includes a negative meniscus lens L9 having a convex surface directed toward the object side.

The third lens unit G3 includes a biconvex positive lens L10, a biconvex positive lens L11, a biconcave negative lens L12, and a positive meniscus lens L13 having a convex surface directed toward the object side. Here, the biconvex positive lens L11 and the biconcave negative lens L12 are cemented.

Moreover, at the time of focusing from an object at infinity to an object at a close distance, the negative meniscus lens L9 moves toward an image side along an optical axis.

An aspherical surface is provided to a total of four surfaces which are, both surfaces of the negative meniscus lens L2 and both surfaces of the negative meniscus lens L9.

Next, a single-focus optical system according to an example 6 will be described below.

The single-focus optical system according to the example 6 includes in order from an object side, a first lens unit G1 having a positive refractive power, a second lens unit G2 having a negative refractive power, and a third lens unit G3 having a positive refractive power. The first lens unit G1 includes an aperture stop S.

The first lens unit G1 includes a first sub-unit, a second sub-unit, and a third sub-unit. The first sub-unit includes a negative meniscus lens L1 having a convex surface directed toward the object side and a negative meniscus lens L2 having a convex surface directed toward the object side. The second sub-unit includes a biconvex positive lens L3, a biconcave negative lens L4, a biconcave negative lens L5, and a biconvex positive lens L6. The third sub-unit includes a biconvex positive lens L7 and a biconvex positive lens L8. Here, the biconvex positive lens L3 and the biconcave negative lens L4 are cemented. Moreover, the biconcave negative lens L5 and the biconvex positive lens L6 are cemented.

The second lens unit G2 includes a negative meniscus lens L9 having a convex surface directed toward the object side.

The third lens unit G3 includes a biconvex positive lens L10, a biconvex positive lens L11, a biconcave negative lens L12, and a positive meniscus lens L13 having a convex surface directed toward the object side. Here, the biconvex positive lens L11 and the biconcave negative lens L12 are cemented.

Moreover, at the time of focusing from an object at infinity to an object at a close distance, the negative meniscus lens L9 moves toward an image side along an optical axis.

An aspherical surface is provided to a total of four surfaces which are, both surfaces of the negative meniscus lens L2 and both surfaces of the negative meniscus lens L9.

Next, a single-focus optical system according to an example 7 will be described below.

The single-focus optical system according to the example 7 includes in order from an object side, a first lens unit G1 having a positive refractive power, a second lens unit G2 having a negative refractive power, and a third lens unit G3 having a positive refractive power. The first lens unit G1 includes an aperture stop S.

The first lens unit G1 includes a first sub-unit, a second sub-unit, and a third sub-unit. The first sub-unit includes a negative meniscus lens L1 having a convex surface directed toward the object side and a positive meniscus lens L2 having a convex surface directed toward the object side. The second sub-unit includes a positive meniscus lens L3 having a convex surface directed toward the object side, a negative meniscus lens L4 having a convex surface directed toward the object side, a biconcave negative lens L5, and a biconvex positive lens L6. The third sub-unit includes a biconvex positive lens L7 and a positive meniscus lens L8 having a convex surface directed toward the object side. Here, the positive meniscus lens L3 and the negative meniscus lens L4 are cemented. Moreover, the biconcave negative lens L5 and the biconvex positive lens L6 are cemented.

The second lens unit G2 includes a negative meniscus lens L9 having a convex surface directed toward the object side.

The third lens unit G3 includes a positive meniscus lens L10 having a convex surface directed toward an image side, a biconvex positive lens L11, a biconcave negative lens L12, and a biconvex positive lens L13. Here, the biconvex positive lens L11 and the biconcave negative lens L12 are cemented.

Moreover, at the time of focusing from an object at infinity to an object at a close distance, the negative meniscus lens L9 moves toward the image side along an optical axis.

An aspherical surface is provided to both surfaces of the negative meniscus lens L9.

Next, a single-focus optical system according to an example 8 will be described below.

The single-focus optical system according to the example 8 includes in order from an object side, a first lens unit G1 having a positive refractive power, a second lens unit G2 having a negative refractive power, and a third lens unit G3 having a positive refractive power. The first lens unit G1 includes an aperture stop S.

The first lens unit G1 includes a first sub-unit, a second sub-unit, and a third sub-unit. The first sub-unit includes a negative meniscus lens L1 having a convex surface directed toward the object side and a negative meniscus lens L2 having a convex surface directed toward the object side. The second sub-unit includes a biconvex positive lens L3, a biconcave negative lens L4, a biconcave negative lens L5, and a biconvex positive lens L6. The third sub-unit includes a biconvex positive lens L7 and a biconvex positive lens L8. Here, the biconvex positive lens L3 and the biconcave negative lens L4 are cemented. Moreover, the biconcave negative lens L5 and the biconvex positive lens L6 are cemented.

The second lens unit G2 includes a negative meniscus lens L9 having a convex surface directed toward the object side.

The third lens unit G3 includes a biconvex positive lens L10, a biconcave negative lens L11 and a biconvex positive lens L12. Here, the biconcave negative lens L11 and the biconvex positive lens L12 are cemented.

Moreover, at the time of focusing from an object at infinity to an object at a close distance, the negative meniscus lens L9 moves toward an image side along an optical axis, and the biconvex positive lens L10 moves toward the object side along the optical axis.

An aspherical surface is provided to a total of six surfaces which are, both surfaces of the negative meniscus lens L2, both surfaces of the negative meniscus lens L9, and both surfaces of the biconvex positive lens L10.

Next, a single-focus optical system according to an example 9 will be described below.

The single-focus optical system according to the example 9 includes in order from an object side, a first lens unit G1 having a positive refractive power, a second lens unit G2 having a negative refractive power, and a third lens unit G3 having a positive refractive power. The first lens unit G1 includes an aperture stop S.

The first lens unit G1 includes a first sub-unit, a second sub-unit, and a third sub-unit. The first sub-unit includes a negative meniscus lens L1 having a convex surface directed toward the object side and a negative meniscus lens L2 having a convex surface directed toward the object side. The second sub-unit includes a biconvex positive lens L3, a biconcave negative lens L4, a biconcave negative lens L5, and a biconvex positive lens L6. The third sub-unit includes a biconvex positive lens L7 and a positive meniscus lens L8 having a convex surface directed toward the object side. Here, the biconvex positive lens L3 and the biconcave negative lens L4 are cemented. Moreover, the biconcave negative lens L5 and the biconvex positive lens L6 are cemented.

The second lens unit G2 includes a negative meniscus lens L9 having a convex surface directed toward the object side.

The third lens unit G3 includes a biconvex positive lens L10, a negative meniscus lens L11 having a convex surface directed toward the object side and a biconvex positive lens L12. Here, the negative meniscus lens L11 and the biconvex positive lens L12 are cemented.

Moreover, at the time of focusing from an object at infinity to an object at a close distance, the negative meniscus lens L9 moves toward an image side along an optical axis, and the biconvex positive lens L10 moves toward the object side along the optical axis.

An aspherical surface is provided to a total of four surfaces which are, both surfaces of the negative meniscus lens L9 and both surfaces of the biconvex positive lens L10.

Next, a single-focus optical system according to an example 10 will be described below.

The single-focus optical system according to the example 10 includes in order from an object side, a first lens unit G1 having a positive refractive power, a second lens unit G2 having a negative refractive power, and a third lens unit G3 having a positive refractive power. The first lens unit G1 includes an aperture stop S.

The first lens unit G1 includes a first sub-unit, a second sub-unit, and a third sub-unit. The first sub-unit includes a negative meniscus lens L1 having a convex surface directed toward the object side and a positive meniscus lens L2 having a convex surface directed toward the object side. The second sub-unit includes a positive meniscus lens L3 having a convex surface directed toward the object side, a negative meniscus lens L4 having a convex surface directed toward the object side, a biconcave negative lens L5, and a biconvex positive lens L6. The third sub-unit includes a positive meniscus lens L7 having a convex surface directed toward an image side and a biconvex positive lens L8. Here, the positive meniscus lens L3 and the negative meniscus lens L4 are cemented. Moreover, the biconcave negative lens L5 and the biconvex positive lens L6 are cemented.

The second lens unit G2 includes a negative meniscus lens L9 having a convex surface directed toward the object side.

The third lens unit G3 includes a biconvex positive lens L10, a biconcave negative lens L11 and a biconvex positive lens L12. Here, the biconcave negative lens L11 and the biconvex positive lens L12 are cemented.

Moreover, at the time of focusing from an object at infinity to an object at a close distance, the negative meniscus lens L9 moves toward the image side along an optical axis, and the biconvex positive lens L10 moves toward the object side along the optical axis.

An aspherical surface is provided to a total of four surfaces which are, both surfaces of the negative meniscus lens L9 and both surfaces of the biconvex positive lens L10.

Next, a single-focus optical system according to an example 11 will be described below.

The single-focus optical system according to the example 11 includes in order from an object side, a first lens unit G1 having a positive refractive power, a second lens unit G2 having a negative refractive power, and a third lens unit G3 having a positive refractive power. The first lens unit G1 includes an aperture stop S.

The first lens unit G1 includes a first sub-unit, a second sub-unit, and a third sub-unit. The first sub-unit includes a negative meniscus lens L1 having a convex surface directed toward the object side and a negative meniscus lens L2 having a convex surface directed toward the object side. The second sub-unit includes a biconvex positive lens L3, a biconcave negative lens L4, a biconcave negative lens L5, and a biconvex positive lens L6. The third sub-unit includes a biconvex positive lens L7, a biconvex positive lens L8, and a negative meniscus lens L9 having a convex surface directed toward an image side. Here, the biconvex positive lens L3 and the biconcave negative lens L4 are cemented. Moreover, the biconcave negative lens L5 and the biconvex positive lens L6 are cemented. Moreover, the biconvex positive lens L8 and the negative meniscus lens L9 are cemented.

The second lens unit G2 includes a negative meniscus lens L10 having a convex surface directed toward the object side.

The third lens unit G3 includes a negative meniscus lens L11 having a convex surface directed toward the object side, a biconvex positive lens L12, and a negative meniscus lens L13 having a convex surface directed toward the image side. Here, the negative meniscus lens L11 and the biconvex positive lens L12 are cemented.

Moreover, at the time of focusing from an object at infinity to an object at a close distance, the negative meniscus lens L10 moves toward the image side along an optical axis, and the negative meniscus lens L11 and the biconvex positive lens L12 move toward the object side along the optical axis.

An aspherical surface is provided to a total of five surfaces which are, both surfaces of the negative meniscus lens L2, both surfaces of the negative meniscus lens L10, and an image-side surface of the biconvex positive lens L12.

Next, a single-focus optical system according to an example 12 will be described below.

The single-focus optical system according to the example 12 includes in order from an object side, a first lens unit G1 having a positive refractive power, a second lens unit G2 having a negative refractive power, and a third lens unit G3 having a positive refractive power. The first lens unit G1 includes an aperture stop S.

The first lens unit G1 includes a first sub-unit, a second sub-unit, and a third sub-unit. The first sub-unit includes a negative meniscus lens L1 having a convex surface directed toward the object side and a negative meniscus lens L2 having a convex surface directed toward the object side. The second sub-unit includes a biconvex positive lens L3, a biconcave negative lens L4, a biconcave negative lens L5, and a biconvex positive lens L6. The third sub-unit includes a biconvex positive lens L7, a biconvex positive lens L8, and a negative meniscus lens L9 having a convex surface directed toward an image side. Here, the biconvex positive lens L3 and the biconcave negative lens L4 are cemented. Moreover, the biconcave negative lens L5 and the biconvex positive lens L6 are cemented. Moreover, the biconvex positive lens L8 and the negative meniscus lens L9 are cemented.

The second lens unit G2 includes a biconcave negative lens L10 and a negative meniscus lens L11 having a convex surface directed toward the object side. Here, the biconcave negative lens L10 and the negative meniscus lens L11 are cemented.

The third lens unit G3 includes a biconvex positive lens L12 and a biconcave negative lens L13.

Moreover, at the time of focusing from an object at infinity to an object at a close distance, the biconcave negative lens L10 and the negative meniscus lens L11 move toward the image side along an optical axis, and the biconvex positive lens L12 moves toward the object side along the optical axis.

An aspherical surface is provided to a total of six surfaces which are, both surfaces of the negative meniscus lens L2, an object-side surface of the biconcave negative lens L10, an image-side surface of the negative meniscus lens L11, and both surfaces of the biconvex positive lens L12.

Next, numerical data of optical components configuring the single-focus optical system of each above example are shown. In numerical data of each example, r1, r2, . . . denotes a curvature radius of each lens surface, d1, d2, . . . denotes a thickness of each lens or an air distance between adjacent lens surfaces, nd1, nd2, . . . denotes a refractive index of each lens for d-line, ν1, νd2, . . . denotes an Abbe number of each lens, * denotes an aspherical surface. Moreover, in various data, f denotes a focal length of an imaging optical system as a whole, FNO. denotes an F number, ω denotes a half angle of view, IH denotes an image height, FB denotes a back focus, LTL denotes a lens total length. The lens total length is the distance from the frontmost lens surface to the rearmost lens surface plus back focus. The back focus is a unit which is expressed upon air conversion of a distance from the lens backmost surface to a paraxial image surface. Moreover, the unit of angle is ° (degree). Moreover, Infinity indicates the time of focusing to an object at infinity and Close distance indicates the time of focusing to an object at a close distance.

A shape of an aspherical surface is defined by the following expression where the direction of the optical axis is represented by z, the direction orthogonal to the optical axis is represented by y, a conical coefficient is represented by K, aspherical surface coefficients are represented by A4, A6, A8, A10, $$Z=(y^2/r)/[1+\{1-(1+k)(y/r)^2\}^{1/2}]+A4y^4+A6y^6+A8y^8+A10y^{10}$$

Further, in the aspherical surface coefficients, 'e-n' (where, n is an integral number) indicates '$10^{-n}$'. Moreover, these symbols are commonly used in the following numerical data for each example.

Example 1

| Unit mm | | | | |
|---|---|---|---|---|
| Surface data | | | | |
| Surface no. | r | d | nd | νd |
| Object plane | ∞ | ∞ | | |
| 1* | 88.390 | 1.50 | 1.58313 | 59.38 |
| 2 | 18.061 | 3.03 | | |
| 3 | 37.369 | 5.62 | 2.00069 | 25.46 |
| 4 | −34.405 | 1.00 | 1.80610 | 40.92 |
| 5* | 21.776 | 6.79 | | |
| 6 | −13.943 | 1.20 | 1.80518 | 25.42 |
| 7 | 104.914 | 5.50 | 1.72916 | 54.68 |
| 8 | −23.818 | 0.40 | | |
| 9 | −51.466 | 3.06 | 2.00100 | 29.13 |
| 10 | −27.493 | 0.40 | | |
| 11 | 456.546 | 3.21 | 1.72916 | 54.68 |
| 12 | −54.882 | 0.60 | | |

-continued

Unit mm

| | | | | |
|---|---|---|---|---|
| 13 (Stop) | ∞ | 0.60 | | |
| 14 | 31.746 | 6.64 | 1.43875 | 94.93 |
| 15 | −57.403 | Variable | | |
| 16* | 55.821 | 1.20 | 1.88202 | 37.22 |
| 17* | 21.400 | Variable | | |
| 18 | 58.597 | 7.89 | 1.49700 | 81.61 |
| 19* | −22.104 | 0.40 | | |
| 20 | 53.129 | 6.95 | 1.65160 | 58.55 |
| 21 | −157.363 | 0.40 | | |
| 22 | 46.040 | 1.50 | 1.84666 | 23.78 |
| 23 | 25.000 | 13.44 | | |
| 24 | ∞ | 2.66 | 1.51633 | 64.14 |
| 25 | ∞ | 1.00 | | |
| Image plane | ∞ | | | |

Aspherical surface data

1st surface k = 0.000
A4 = 1.39089e−05, A6 = −3.51071e−08,
A8 = 3.62113e−11

5th surface k = 2.001
A4 = 9.68258e−06, A6 = −1.18998e−08,
A8 = −7.24540e−10

16th surface k = 0.000
A4 = −2.43484e−05, A6 = 3.04464e−08,
A8 = −1.53837e−11

17th surface k = 0.000
A4 = −1.81003e−05, A6 = 8.23510e−09,
A8 = −2.70354e−11, A10 = 2.00162e−14

19th surface k = 0.000
A4 = 1.70588e−05, A6 = −1.01511e−08,
A8 = 4.76074e−11

Various data

| | |
|---|---|
| f | 17.27 |
| FNO. | 1.28 |
| 2ω | 72.91 |
| IH | 11.15 |
| FB (in air) | 16.19 |
| LTL (in air) | 85.58 |

| | Infinity | Close distance |
|---|---|---|
| d15 | 2.60 | 5.50 |
| d17 | 8.90 | 6.01 |

Unit focal length

| | | |
|---|---|---|
| f1 = 21.69 | f2 = −40.00 | f3 = 28.81 |

Example 2

Unit mm

Surface data

| Surface no. | r | d | nd | vd |
|---|---|---|---|---|
| Object plane | ∞ | ∞ | | |
| 1* | 60.000 | 1.50 | 1.51633 | 64.14 |
| 2* | 15.321 | 7.79 | | |
| 3 | 51.957 | 4.18 | 2.00069 | 25.46 |
| 4 | −40.711 | 1.67 | 1.58144 | 40.75 |
| 5 | 18.522 | 6.11 | | |
| 6 | −15.466 | 2.14 | 1.80518 | 25.42 |
| 7 | 40.917 | 5.53 | 1.72916 | 54.68 |

-continued

Unit mm

| | | | | |
|---|---|---|---|---|
| 8 | −29.285 | 0.40 | | |
| 9 | 477.426 | 3.40 | 2.00100 | 29.13 |
| 10 | −41.268 | 0.40 | | |
| 11 | 76.380 | 3.61 | 1.72916 | 54.68 |
| 12 | −64.022 | 0.60 | | |
| 13 (Stop) | ∞ | 0.60 | | |
| 14 | 25.427 | 2.74 | 1.43875 | 94.93 |
| 15 | 49.067 | Variable | | |
| 16* | 100.636 | 1.20 | 1.88202 | 37.22 |
| 17* | 20.772 | Variable | | |
| 18 | 52.118 | 6.63 | 1.43875 | 94.93 |
| 19 | −25.082 | 0.40 | | |
| 20 | 35.500 | 5.63 | 1.43875 | 94.93 |
| 21 | −35.582 | 4.29 | | |
| 22 | −25.262 | 1.50 | 1.84666 | 23.78 |
| 23 | −38.219 | 11.33 | | |
| 24 | ∞ | 2.66 | 1.51633 | 64.14 |
| 25 | ∞ | 1.00 | | |
| Image plane | ∞ | | | |

Aspherical surface data

1st surface k = 0.000
A4 = −6.25493e−06, A6 = 3.64926e−09,
A8 = 2.64667e−11

2nd surface k = −0.044
A4 = −3.93649e−06, A6 = −2.57510e−08,
A8 = −7.47822e−11

16th surface k = 0.000
A4 = −3.64663e−05, A6 = 7.16280e−08,
A8 = −1.39163e−10

17th surface k = 0.000
A4 = −2.99600e−05, A6 = 3.10159e−08,
A8 = −1.22130e−10

Various data

| | |
|---|---|
| f | 17.27 |
| FNO. | 1.29 |
| 2ω | 72.94 |
| IH | 11.15 |
| FB (in air) | 14.08 |
| LTL (in air) | 86.56 |

| | Infinity | Close distance |
|---|---|---|
| d15 | 4.29 | 6.64 |
| d17 | 7.85 | 5.50 |

Unit focal length

| | | |
|---|---|---|
| f1 = 20.10 | f2 = −29.89 | f3 = 25.27 |

Example 3

Unit mm

Surface data

| Surface no. | r | d | nd | vd |
|---|---|---|---|---|
| Object plane | ∞ | ∞ | | |
| 1 | 45.000 | 1.50 | 1.48749 | 70.23 |
| 2 | 15.940 | 6.68 | | |
| 3* | 117.273 | 1.20 | 1.58313 | 59.38 |
| 4 | 43.893 | 5.24 | 2.00069 | 25.46 |
| 5 | −32.953 | 1.20 | 1.58144 | 40.75 |
| 6 | 17.981 | 6.43 | | |
| 7 | −16.100 | 1.20 | 1.80518 | 25.42 |

-continued

Unit mm

| | | | | |
|---|---|---|---|---|
| 8 | 38.948 | 6.76 | 1.72916 | 54.68 |
| 9 | −25.538 | 0.20 | | |
| 10 | −113.515 | 2.27 | 2.00100 | 29.13 |
| 11 | −45.425 | 0.20 | | |
| 12 | 60.466 | 5.42 | 1.72916 | 54.68 |
| 13 | −43.382 | 0.70 | | |
| 14 (Stop) | ∞ | 0.40 | | |
| 15 | 31.583 | 2.76 | 1.49700 | 81.61 |
| 16 | 70.705 | Variable | | |
| 17* | 80.495 | 1.20 | 1.85400 | 40.39 |
| 18* | 21.402 | Variable | | |
| 19 | 59.511 | 6.44 | 1.43875 | 94.93 |
| 20 | −27.694 | 0.20 | | |
| 21 | 126.850 | 3.39 | 1.58313 | 59.38 |
| 22 | −46.638 | 0.20 | | |
| 23 | 56.417 | 2.63 | 1.43875 | 94.93 |
| 24 | −173.464 | 2.57 | | |
| 25 | −52.866 | 1.50 | 1.84666 | 23.78 |
| 26 | −335.063 | 11.34 | | |
| 27 | ∞ | 2.66 | 1.51633 | 64.14 |
| 28 | ∞ | 1.00 | | |
| Image plane | ∞ | | | |

Aspherical surface data

3rd surface k = 0.000
A4 = −1.42073e−05, A6 = 1.41551e−08,
A8 = −4.10807e−11
17th surface k = 0.000
A4 = −2.78668e−05, A6 = 3.74803e−08,
A8 = −5.39959e−11
18th surface k = 0.000
A4 = −2.14468e−05, A6 = 1.51713e−08,
A8 = −9.12361e−11

Various data

| f | 17.27 |
|---|---|
| FNO. | 1.28 |
| 2ω | 72.94 |
| IH | 11.15 |
| FB (in air) | 14.10 |
| LTL (in air) | 86.58 |

| | Infinity | Close distance |
|---|---|---|
| d16 | 3.77 | 6.37 |
| d18 | 8.42 | 5.82 |

Unit focal length

| f1 = 20.72 | f2 = −34.46 | f3 = 26.28 |
|---|---|---|

Example 4

Unit mm

Surface data

| Surface no. | r | d | nd | vd |
|---|---|---|---|---|
| Object plane | ∞ | ∞ | | |
| 1 | 45.946 | 1.50 | 1.48749 | 70.23 |
| 2 | 14.406 | 9.15 | | |
| 3* | 130.753 | 1.20 | 1.58313 | 59.38 |
| 4* | 27.135 | 0.76 | | |
| 5 | 28.653 | 6.18 | 2.00069 | 25.46 |
| 6 | −33.821 | 1.20 | 1.58144 | 40.75 |
| 7 | 20.407 | 5.07 | | |
| 8 | −25.734 | 1.20 | 1.80518 | 25.42 |

-continued

Unit mm

| | | | | |
|---|---|---|---|---|
| 9 | 25.000 | 6.18 | 1.69680 | 55.53 |
| 10 | −35.122 | 0.20 | | |
| 11 | 63.389 | 5.66 | 1.72916 | 54.68 |
| 12 | −31.891 | 0.70 | | |
| 13 (Stop) | ∞ | 0.40 | | |
| 14 | 35.850 | 2.94 | 1.49700 | 81.61 |
| 15 | 244.348 | Variable | | |
| 16* | 92.337 | 1.20 | 1.85400 | 40.39 |
| 17* | 25.577 | Variable | | |
| 18 | 54.229 | 4.71 | 1.59522 | 67.74 |
| 19 | −43.438 | 0.20 | | |
| 20 | 30.927 | 5.69 | 2.00100 | 29.13 |
| 21 | −89.137 | 1.20 | 1.80518 | 25.42 |
| 22 | 18.359 | 1.76 | | |
| 23 | 36.962 | 2.79 | 1.72916 | 54.68 |
| 24 | 1389.522 | 11.49 | | |
| 25 | ∞ | 2.66 | 1.51633 | 64.14 |
| 26 | ∞ | 1.00 | | |
| Image plane | ∞ | | | |

Aspherical surface data

3rd surface k = 0.000
A4 = −1.99067e−05, A6 = 6.32029e−09,
A8 = −1.75482e−10
4th surface k = 0.000
A4 = −5.57900e−06, A6 = −7.59483e−09,
A8 = −1.60555e−10
16th surface k = 0.000
A4 = −2.38100e−06, A6 = 4.81486e−09,
A8 = −7.43803e−14
17th surface k = 0.000
A4 = 3.21789e−06, A6 = 3.58266e−09,
A8 = 7.48716e−12

Various data

| f | 17.27 |
|---|---|
| FNO. | 1.29 |
| 2ω | 72.96 |
| IH | 11.15 |
| FB (in air) | 14.25 |
| LTL (in air) | 86.58 |

| | Infinity | Close distance |
|---|---|---|
| d15 | 2.62 | 6.20 |
| d17 | 9.83 | 6.25 |

Unit focal length

| f1 = 24.02 | f2 = −41.77 | f3 = 26.68 |
|---|---|---|

Example 5

Unit mm

Surface data

| Surface no. | r | d | nd | vd |
|---|---|---|---|---|
| Object plane | ∞ | ∞ | | |
| 1 | 40.000 | 1.50 | 1.48749 | 70.23 |
| 2 | 14.959 | 10.01 | | |
| 3* | 284.838 | 1.20 | 1.49700 | 81.61 |
| 4* | 24.501 | 1.55 | | |
| 5 | 30.509 | 6.26 | 2.00069 | 25.46 |

-continued

Unit mm

| Surface no. | r | d | nd | vd |
|---|---|---|---|---|
| 6 | −32.686 | 1.30 | 1.58144 | 40.75 |
| 7 | 22.918 | 4.80 | | |
| 8 | −27.864 | 1.20 | 1.85478 | 24.80 |
| 9 | 25.040 | 6.47 | 1.69680 | 55.53 |
| 10 | −34.741 | 0.20 | | |
| 11 | 55.767 | 5.17 | 1.72916 | 54.68 |
| 12 | −35.759 | 0.20 | | |
| 13 | 36.555 | 3.19 | 1.43875 | 94.93 |
| 14 | 4229.057 | 0.62 | | |
| 15 (Stop) | ∞ | Variable | | |
| 16* | 112.818 | 1.20 | 1.85400 | 40.39 |
| 17* | 25.701 | Variable | | |
| 18 | 70.785 | 3.81 | 1.72916 | 54.68 |
| 19 | −48.006 | 0.20 | | |
| 20 | 28.778 | 5.11 | 2.00100 | 29.13 |
| 21 | −53.599 | 1.20 | 1.85478 | 24.80 |
| 22 | 18.702 | 1.95 | | |
| 23 | 38.612 | 2.63 | 1.72916 | 54.68 |
| 24 | 13210.087 | 11.35 | | |
| 25 | ∞ | 2.66 | 1.51633 | 64.14 |
| 26 | ∞ | 1.00 | | |
| Image plane | ∞ | | | |

Aspherical surface data

3rd surface k = 0.000
A4 = −1.98270e−05, A6 = −1.62289e−08,
A8 = −6.87416e−11

4th surface k = 0.000
A4 = −4.30732e−06, A6 = −4.24639e−08,
A8 = −4.55491e−11

16th surface k = 0.000
A4 = −1.79188e−06, A6 = 1.11638e−10

17th surface k = 0.000
A4 = 3.97297e−06, A6 = −1.99307e−10

Various data

| f | 17.27 |
|---|---|
| FNO. | 1.29 |
| 2ω | 72.65 |
| IH | 11.15 |
| FB (in air) | 14.11 |
| LTL (in air) | 86.46 |

| | Infinity | Close distance |
|---|---|---|
| d15 | 3.41 | 6.92 |
| d17 | 9.16 | 5.65 |

Unit focal length

| f1 = 23.96 | f2 = −39.22 | f3 = 25.48 |

Example 6

Unit mm

Surface data

| Surface no. | r | d | nd | vd |
|---|---|---|---|---|
| Object plane | ∞ | ∞ | | |
| 1 | 1822.498 | 1.50 | 1.48749 | 70.23 |
| 2 | 24.046 | 4.33 | | |
| 3* | 104.293 | 1.20 | 1.49700 | 81.61 |

-continued

Unit mm

| Surface no. | r | d | nd | vd |
|---|---|---|---|---|
| 4* | 85.426 | 0.40 | | |
| 5 | 33.165 | 6.73 | 2.00069 | 25.46 |
| 6 | −41.379 | 1.20 | 1.58144 | 40.75 |
| 7 | 21.826 | 6.38 | | |
| 8 | −26.782 | 1.20 | 1.85478 | 24.80 |
| 9 | 25.731 | 7.42 | 1.69680 | 55.53 |
| 10 | −36.641 | 0.20 | | |
| 11 | 52.705 | 5.13 | 1.72916 | 54.68 |
| 12 | −51.343 | 0.20 | | |
| 13 | 46.341 | 3.42 | 1.43875 | 94.93 |
| 14 | −290.158 | 0.60 | | |
| 15 (Stop) | ∞ | Variable | | |
| 16* | 70.509 | 1.20 | 1.74320 | 49.34 |
| 17* | 24.442 | Variable | | |
| 18 | 466.560 | 3.82 | 1.72916 | 54.68 |
| 19 | −36.184 | 0.20 | | |
| 20 | 22.789 | 5.31 | 2.00100 | 29.13 |
| 21 | −224.725 | 1.20 | 1.85478 | 24.80 |
| 22 | 16.310 | 2.53 | | |
| 23 | 40.941 | 1.79 | 1.72916 | 54.68 |
| 24 | 84.296 | 11.94 | | |
| 25 | ∞ | 2.66 | 1.51633 | 64.14 |
| 26 | ∞ | 1.00 | | |
| Image plane | ∞ | | | |

Aspherical surface data

3rd surface k = 0.000
A4 = −1.20042e−05, A6 = 2.38213e−09,
A8 = −2.73467e−12

4th surface k = 0.000
A4 = −5.23359e−07, A6 = 7.45881e−09,
A8 = 1.61344e−11

16th surface k = 0.000
A4 = −1.14003e−05, A6 = 1.53037e−08

17th surface k = 0.000
A4 = −7.07063e−06, A6 = 7.53398e−09

Various data

| f | 24.59 |
|---|---|
| FNO. | 1.29 |
| 2ω | 51.63 |
| IH | 11.15 |
| FB (in air) | 14.70 |
| LTL (in air) | 86.58 |

| | Infinity | Close distance |
|---|---|---|
| d15 | 3.40 | 9.24 |
| d17 | 12.53 | 6.69 |

Unit focal length

| f1 = 33.40 | f2 = −50.90 | f3 = 31.32 |

Example 7

Unit mm

Surface data

| Surface no. | r | d | nd | vd |
|---|---|---|---|---|
| Object plane | ∞ | ∞ | | |
| 1 | 848.636 | 1.50 | 1.48749 | 70.23 |
| 2 | 26.057 | 1.34 | | |
| 3 | 30.008 | 4.14 | 2.00100 | 29.13 |
| 4 | 79.152 | 0.40 | | |

-continued

Unit mm

| | | | | |
|---|---|---|---|---|
| 5 | 31.332 | 3.61 | 2.00069 | 25.46 |
| 6 | 72.289 | 1.50 | 1.58144 | 40.75 |
| 7 | 14.571 | 10.23 | | |
| 8 | −26.712 | 1.50 | 1.85478 | 24.80 |
| 9 | 34.227 | 8.21 | 1.69680 | 55.53 |
| 10 | −37.482 | 0.20 | | |
| 11 | 52.231 | 5.56 | 1.69680 | 55.53 |
| 12 | −44.033 | 0.20 | | |
| 13 | 30.054 | 3.96 | 1.43875 | 94.93 |
| 14 | 169.005 | 1.03 | | |
| 15 (Stop) | ∞ | Variable | | |
| 16* | 1643.120 | 1.20 | 1.74320 | 49.34 |
| 17* | 24.933 | Variable | | |
| 18 | −933.181 | 3.97 | 1.72916 | 54.68 |
| 19 | −31.002 | 0.20 | | |
| 20 | 22.554 | 5.95 | 2.00100 | 29.13 |
| 21 | −178.529 | 1.20 | 1.85478 | 24.80 |
| 22 | 17.042 | 2.82 | | |
| 23 | 59.139 | 2.97 | 1.72916 | 54.68 |
| 24 | −698.477 | 11.56 | | |
| 25 | ∞ | 2.66 | 1.51633 | 64.14 |
| 26 | ∞ | 1.00 | | |
| Image plane | ∞ | | | |

Aspherical surface data

16th surface k = 0.000
A4 = −1.06473e−05, A6 = 2.88989e−08,
A8 = −8.90399e−12

17th surface k = 0.000
A4 = −2.82395e−06, A6 = 9.74767e−09,
A8 = 1.85663e−12

Various data

| | |
|---|---|
| f | 25.77 |
| FNO. | 1.29 |
| 2ω | 48.87 |
| IH | 11.15 |
| FB(in air) | 14.31 |
| LTL(in air) | 88.04 |

| | Infinity | Close distance |
|---|---|---|
| d15 | 2.90 | 7.95 |
| d17 | 9.15 | 4.10 |

Unit focal length

| | | |
|---|---|---|
| f1 = 32.91 | f2 = −34.08 | f3 = 25.80 |

Example 8

Unit mm

Surface data

| Surface no. | r | d | nd | νd |
|---|---|---|---|---|
| Object plane | ∞ | ∞ | | |
| 1 | 45.177 | 1.50 | 1.48749 | 70.23 |
| 2 | 17.000 | 4.00 | | |
| 3* | 21.613 | 1.50 | 1.49700 | 81.55 |
| 4* | 16.408 | 3.71 | | |
| 5 | 33.130 | 4.48 | 1.96883 | 28.00 |
| 6 | −186.862 | 1.04 | 1.54957 | 51.13 |
| 7 | 14.440 | 9.33 | | |

-continued

Unit mm

| | | | | |
|---|---|---|---|---|
| 8 | −18.541 | 1.20 | 1.85478 | 24.80 |
| 9 | 28.572 | 5.84 | 1.72861 | 54.71 |
| 10 | −30.117 | 1.54 | | |
| 11 | 286.405 | 4.55 | 1.99807 | 29.24 |
| 12 | −33.276 | 0.43 | | |
| 13 | 36.446 | 3.78 | 1.72662 | 54.82 |
| 14 | −2481.168 | 1.40 | | |
| 15 (Stop) | ∞ | Variable | | |
| 16* | 84.278 | 1.20 | 1.88202 | 37.22 |
| 17* | 24.173 | Variable | | |
| 18* | 42.431 | 4.89 | 1.72905 | 54.69 |
| 19* | −31.908 | Variable | | |
| 20 | −82.933 | 1.50 | 1.84665 | 23.78 |
| 21 | 36.531 | 5.54 | 1.60104 | 64.35 |
| 22 | −28.145 | 13.06 | | |
| 23 | ∞ | 2.66 | 1.51633 | 64.14 |
| 24 | ∞ | 1.00 | | |
| Image plane | ∞ | | | |

Aspherical surface data

3rd surface k = 0.000
A4 = 5.19654e−05, A6 = −2.81630e−07,
A8 = 7.08313e−13

4th surface k = 0.000
A4 = 5.38337e−05, A6 = −3.12605e−07,
A8 = −7.17510e−10

16th surface k = 0.000
A4 = −1.30471e−05, A6 = 1.96636e−07,
A8 = −5.69299e−10

17th surface k = 0.000
A4 = −7.78499e−06, A6 = 1.86510e−07,
A8 = −3.57991e−10

18th surface k = 0.000
A4 = −1.34050e−07, A6 = 8.63654e−09,
A8 = −4.17685e−11

19th surface k = 0.000
A4 = 2.46242e−05, A6 = −1.08174e−08,
A8 = −3.39479e−11

Various data

| | |
|---|---|
| f | 14.43 |
| FNO. | 1.29 |
| 2ω | 82.71 |
| IH | 11.15 |
| FB(in air) | 15.81 |
| LTL(in air) | 88.12 |

| | Infinity | Close distance |
|---|---|---|
| d15 | 4.10 | 6.92 |
| d17 | 8.69 | 4.33 |
| d19 | 2.10 | 3.63 |

Unit focal length

| | | |
|---|---|---|
| f1 = 20.13 | f2 = −38.79 | f3 = 24.62 |

Example 9

| | Unit mm | | | |
|---|---|---|---|---|
| | Surface data | | | |
| Surface no. | r | d | nd | vd |
| Object plane | ∞ | ∞ | | |
| 1 | 45.036 | 1.50 | 1.48749 | 70.23 |
| 2 | 18.798 | 3.57 | | |
| 3 | 31.519 | 1.50 | 1.43700 | 95.00 |
| 4 | 18.954 | 3.09 | | |
| 5 | 33.264 | 4.23 | 2.00100 | 29.14 |
| 6 | −654.148 | 1.00 | 1.57135 | 52.95 |
| 7 | 14.026 | 9.91 | | |
| 8 | −16.426 | 1.20 | 1.85478 | 24.80 |
| 9 | 36.552 | 5.68 | 1.72916 | 54.68 |
| 10 | −27.504 | 0.41 | | |
| 11 | 921.803 | 4.77 | 2.00100 | 29.14 |
| 12 | −29.779 | 0.50 | | |
| 13 | 33.641 | 3.87 | 1.72916 | 54.68 |
| 14 | 802.835 | 1.49 | | |
| 15 (Stop) | ∞ | Variable | | |
| 16* | 128.134 | 1.20 | 1.88202 | 37.22 |
| 17* | 25.190 | Variable | | |
| 18* | 45.242 | 5.17 | 1.69350 | 53.21 |
| 19* | −30.726 | Variable | | |
| 20 | 180.235 | 1.50 | 1.85478 | 24.80 |
| 21 | 24.427 | 7.24 | 1.49700 | 81.61 |
| 22 | −27.240 | 12.81 | | |
| 23 | ∞ | 2.66 | 1.51633 | 64.14 |
| 24 | ∞ | 1.00 | | |
| Image plane | ∞ | | | |

| Aspherical surface data |
|---|

16th surface k = 0.000
A4 = −2.35489e−05, A6 = 2.08977e−07,
A8 = −5.75192e−10

17th surface k = 0.000
A4 = −1.64225e−05, A6 = 2.02401e−07,
A8 = −4.53593e−10

18th surface k = 0.000
A4 = −4.76620e−06, A6 = 2.89813e−09,
A8 = 1.65972e−12

19th surface k = 0.000
A4 = 1.85762e−05, A6 = −1.85673e−08,
A8 = −2.32249e−12

| Various data | |
|---|---|
| f | 14.43 |
| FNO. | 1.28 |
| 2ω | 82.98 |
| IH | 11.15 |
| FB(in air) | 15.56 |
| LTL(in air) | 87.36 |

| | Infinity | Close distance |
|---|---|---|
| d15 | 4.10 | 6.71 |
| d17 | 7.77 | 4.10 |
| d19 | 2.10 | 3.16 |

| Unit focal length | | |
|---|---|---|
| f1 = 20.23 | f2 = −35.74 | f3 = 24.10 |

Example 10

| | Unit mm | | | |
|---|---|---|---|---|
| | Surface data | | | |
| Surface no. | r | d | nd | vd |
| Object plane | ∞ | ∞ | | |
| 1 | 45.139 | 1.50 | 1.48749 | 70.23 |
| 2 | 19.428 | 2.14 | | |
| 3 | 25.204 | 3.00 | 2.00100 | 29.14 |
| 4 | 30.000 | 0.89 | | |
| 5 | 32.668 | 3.89 | 2.00100 | 29.14 |
| 6 | 145.374 | 1.06 | 1.69895 | 30.13 |
| 7 | 15.005 | 7.16 | | |
| 8 | −16.973 | 1.20 | 1.85478 | 24.80 |
| 9 | 33.157 | 6.55 | 1.80440 | 39.59 |
| 10 | −31.101 | 0.40 | | |
| 11 | −291.093 | 4.14 | 2.00100 | 29.14 |
| 12 | −33.778 | 0.55 | | |
| 13 | 31.502 | 4.59 | 1.72916 | 54.68 |
| 14 | −2185.944 | 1.40 | | |
| 15 (Stop) | ∞ | Variable | | |
| 16* | 228.186 | 1.20 | 1.58313 | 59.38 |
| 17* | 18.790 | Variable | | |
| 18* | 30.585 | 7.76 | 1.69350 | 53.21 |
| 19* | −27.119 | Variable | | |
| 20 | −47.315 | 1.50 | 1.85478 | 24.80 |
| 21 | 25.460 | 5.95 | 1.72916 | 54.68 |
| 22 | −38.878 | 13.73 | | |
| 23 | ∞ | 2.66 | 1.51633 | 64.14 |
| 24 | ∞ | 1.00 | | |
| Image plane | ∞ | | | |

| Aspherical surface data |
|---|

16th surface k = 0.000
A4 = −3.19803e−05, A6 = 2.26858e−07,
A8 = −5.60129e−10

17th surface k = 0.000
A4 = −3.67839e−05, A6 = 2.04164e−07,
A8 = −5.35483e−10

18th surface k = 0.000
A4 = −5.17599e−06, A6 = −6.11069e−09,
A8 = −2.12624e−11

19th surface k = 0.000
A4 = 1.87622e−05, A6 = −1.76699e−08,
A8 = −1.41729e−12

| Various data | |
|---|---|
| f | 20.62 |
| FNO. | 1.29 |
| 2ω | 62.33 |
| IH | 11.15 |
| FB(in air) | 16.49 |
| LTL(in air) | 87.07 |

| | Infinity | Close distance |
|---|---|---|
| d15 | 4.14 | 4.74 |
| d17 | 9.36 | 8.58 |
| d19 | 2.20 | 2.38 |

| Unit focal length | | |
|---|---|---|
| f1 = 28.68 | f2 = −35.19 | f3 = 24.94 |

Example 11

Unit mm

Surface data

| Surface no. | r | d | nd | vd |
|---|---|---|---|---|
| Object plane | ∞ | ∞ | | |
| 1 | 54.301 | 1.50 | 1.48749 | 70.23 |
| 2 | 17.105 | 4.00 | | |
| 3* | 22.655 | 1.50 | 1.49700 | 81.61 |
| 4* | 13.783 | 5.65 | | |
| 5 | 47.419 | 4.91 | 2.00100 | 29.14 |
| 6 | −40.946 | 1.50 | 1.49700 | 81.61 |
| 7 | 17.739 | 6.17 | | |
| 8 | −18.916 | 1.20 | 1.85478 | 24.80 |
| 9 | 22.938 | 5.88 | 1.72916 | 54.68 |
| 10 | −30.236 | 1.43 | | |
| 11 (Stop) | ∞ | 1.00 | | |
| 12 | 86.514 | 5.50 | 2.00100 | 29.14 |
| 13 | −30.725 | 0.40 | | |
| 14 | 31.726 | 7.58 | 1.49700 | 81.61 |
| 15 | −23.755 | 1.20 | 2.00100 | 29.14 |
| 16 | −72.101 | Variable | | |
| 17* | 58.976 | 1.20 | 1.88202 | 37.22 |
| 18* | 23.004 | Variable | | |
| 19 | 35.206 | 1.50 | 1.85478 | 24.80 |
| 20 | 21.523 | 7.64 | 1.69350 | 53.21 |
| 21* | −23.391 | Variable | | |
| 22 | −89.135 | 1.50 | 1.85478 | 24.80 |
| 23 | −355.544 | 10.81 | | |
| 24 | ∞ | 2.66 | 1.51633 | 64.14 |
| 25 | ∞ | 1.00 | | |
| Image plane | ∞ | | | |

Aspherical surface data

3rd surface k = 0.000
A4 = 4.11853e−05, A6 = −5.16604e−07,
A8 = 1.05864e−09

4th surface k = 0.000
A4 = 4.38670e−05, A6 = −6.01995e−07,
A8 = −1.18982e−10

17th surface k = 0.000
A4 = −8.15788e−06, A6 = 1.62936e−07,
A8 = −2.77428e−10

18th surface k = 0.000
A4 = −5.38507e−06, A6 = 1.41312e−07,
A8 = −6.87814e−11

21th surface k = 0.000
A4 = 3.31222e−05, A6 = −3.47713e−08,
A8 = 4.91193e−11

Various data

| | |
|---|---|
| f | 14.43 |
| FNO. | 1.28 |
| 2ω | 82.67 |
| IH | 11.15 |
| FB(in air) | 13.57 |
| LTL(in air) | 86.94 |

| | Infinity | Close distance |
|---|---|---|
| d16 | 2.10 | 4.37 |
| d18 | 7.69 | 5.40 |
| d21 | 2.31 | 2.33 |

Unit mm

Unit focal length

| | | |
|---|---|---|
| f1 = 18.77 | f2 = −43.44 | f3 = 26.39 |

Example 12

Unit mm

Surface data

| Surface no. | r | d | nd | vd |
|---|---|---|---|---|
| Object plane | ∞ | ∞ | | |
| 1 | 56.666 | 1.50 | 1.48749 | 70.23 |
| 2 | 17.381 | 4.00 | | |
| 3* | 26.130 | 1.50 | 1.49700 | 81.61 |
| 4* | 14.593 | 5.45 | | |
| 5 | 36.407 | 5.70 | 2.00100 | 29.14 |
| 6 | −43.000 | 1.07 | 1.51633 | 64.14 |
| 7 | 17.284 | 6.73 | | |
| 8 | −16.026 | 1.20 | 1.85478 | 24.80 |
| 9 | 31.874 | 5.80 | 1.72916 | 54.68 |
| 10 | −24.566 | 1.40 | | |
| 11 (Stop) | ∞ | 1.00 | | |
| 12 | 74.674 | 5.36 | 2.00100 | 29.14 |
| 13 | −35.918 | 0.40 | | |
| 14 | 38.381 | 7.78 | 1.49700 | 81.61 |
| 15 | −21.723 | 1.20 | 2.00100 | 29.14 |
| 16 | −51.835 | Variable | | |
| 17* | −876.835 | 1.90 | 1.49700 | 81.61 |
| 18 | 4834.356 | 1.01 | 1.88202 | 37.22 |
| 19* | 34.099 | Variable | | |
| 20* | 26.746 | 7.90 | 1.59201 | 67.02 |
| 21* | −19.467 | Variable | | |
| 22 | −101.033 | 1.50 | 1.85478 | 24.80 |
| 23 | 665.463 | 11.44 | | |
| 24 | ∞ | 2.66 | 1.51633 | 64.14 |
| 25 | ∞ | 1.00 | | |
| Image plane | ∞ | | | |

Aspherical surface data

3rd surface k = 0.000
A4 = 3.02491e−05, A6 = −2.96892e−07,
A8 = 7.24372e−10

4th surface k = 0.000
A4 = 2.08903e−05, A6 = −3.62573e−07,
A8 = −1.14396e−10

17th surface k = 0.000
A4 = 4.34401e−05, A6 = −7.16017e−08,
A8 = 2.37592e−10

19th surface k = 0.000
A4 = 2.76916e−05, A6 = −1.05004e−08,
A8 = 3.38439e−11

20th surface k = 0.000
A4 = −1.95186e−05, A6 = 2.00819e−08,
A8 = −8.54673e−12

21th surface k = 0.000
A4 = 4.36333e−05, A6 = −5.29835e−08,
A8 = 2.29440e−10

-continued

| Unit mm | |
|---|---|
| Various data | |
| f | 14.43 |
| FNO. | 1.28 |
| 2ω | 80.38 |
| IH | 11.15 |
| FB(in air) | 14.19 |
| LTL(in air) | 87.58 |

| | Infinity | Close distance |
|---|---|---|
| d16 | 2.10 | 3.56 |
| d19 | 6.79 | 4.14 |
| d21 | 2.10 | 3.29 |

| Unit focal length | | |
|---|---|---|
| f1 = 19.73 | f2 = −37.91 | f3 = 24.05 |

Next, values of conditional expressions (1) to (6), (11) to (16), and (A) to (C) in each example are given below. '-' (hyphen) indicates that there is no corresponding arrangement.

| Conditional expression | Example1 | Example2 | Example3 |
|---|---|---|---|
| (1) $SF_{11}$ | 1.514 | 1.686 | 2.097 |
| (2) $SF_{12}$ | 3.793 | 2.108 | 2.388 |
| (3) $SF_{13}$ | −3.824 | −3.238 | −4.412 |
| (4) $SF_{14}$-$SF_{15}$ | 3.581 | 3.992 | 4.949 |
| (5) $SF_{21}$ | 2.243 | 1.520 | 1.724 |
| (6) $SF_{31}$ | 0.452 | 0.350 | 0.365 |
| (11) $\beta_{1PR}$ | 2.388 | 2.388 | 2.313 |
| (12) $Nd_{1PR}$ | 1.43875 | 1.43875 | 1.497 |
| (13) $vd_{1PR}$ | 94.93 | 94.93 | 81.61 |
| (14) $\beta_{2NF}$ | 2.254 | 2.254 | 2.258 |
| (15) $Nd_{2NF}$ | 1.88202 | 1.88202 | 1.854 |
| (16) $vd_{2NF}$ | 37.22 | 37.22 | 40.39 |
| (A) f/$e_{N1F}$ | 0.5999003 | 0.5491233 | 0.5507341 |
| (B) (f/$e_{AS}$)/Fno | 0.5142357 | 0.5136662 | 0.5383091 |
| (C) $T_{air\_max}$/Σd | 0.1283268 | 0.1082906 | 0.1161658 |

| Conditional expression | Example4 | Example5 | Example6 |
|---|---|---|---|
| (1) $SF_{11}$ | 1.913 | 2.195 | 1.027 |
| (2) $SF_{12}$ | 5.950 | 7.039 | 4.850 |
| (3) $SF_{13}$ | −6.483 | −9.103 | −6.433 |
| (4) $SF_{14}$-$SF_{15}$ | 1.674 | 1.236 | 0.738 |
| (5) $SF_{21}$ | 1.766 | 1.590 | 2.061 |
| (6) $SF_{31}$ | 0.110 | 0.192 | 0.856 |
| (11) $\beta_{1PR}$ | 2.313 | 2.388 | 2.388 |
| (12) $Nd_{1PR}$ | 1.497 | 1.43875 | 1.43875 |
| (13) $vd_{1PR}$ | 81.61 | 94.93 | 94.93 |
| (14) $\beta_{2NF}$ | 2.258 | 2.258 | 2.276 |
| (15) $Nd_{2NF}$ | 1.854 | 1.854 | 1.72916 |
| (16) $vd_{2NF}$ | 40.39 | 40.39 | 54.68 |
| (A) f/$e_{N1F}$ | 0.5423631 | 0.5218127 | 0.7857366 |
| (B) (f/$e_{AS}$)/Fno | 0.5729585 | 0.6086666 | 0.7636523 |
| (C) $T_{air\_max}$/Σd | 0.1359051 | 0.1383453 | 0.1743081 |

| Conditional expression | Example7 | Example8 | Example9 |
|---|---|---|---|
| (1) $SF_{11}$ | 1.063 | 2.207 | 2.433 |
| (2) $SF_{12}$ | 2.739 | 2.545 | 2.458 |
| (3) $SF_{13}$ | −5.960 | −4.203 | −3.966 |
| (4) $SF_{14}$-$SF_{15}$ | 1.518 | 1.763 | 2.025 |
| (5) $SF_{21}$ | 1.031 | 1.804 | 1.489 |
| (6) $SF_{31}$ | 1.069 | 0.142 | 0.191 |
| (11) $\beta_{1PR}$ | 2.388 | 2.275 | 2.276 |
| (12) $Nd_{1PR}$ | 1.43875 | 1.72662 | 1.72916 |
| (13) $vd_{1PR}$ | 94.93 | 54.82 | 54.68 |
| (14) $\beta_{2NF}$ | 2.237 | 2.254 | 2.254 |
| (15) $Nd_{2NF}$ | 1.7432 | 1.88202 | 1.88202 |
| (16) $vd_{2NF}$ | 49.34 | 37.22 | 37.22 |
| (A) f/$e_{N1F}$ | 0.7343145 | 0.409605 | 0.422059 |
| (B) (f/$e_{AS}$)/Fno | 0.8667391 | 0.496762 | 0.497197 |
| (C) $T_{air\_max}$/Σd | 0.1388118 | 0.129058 | 0.13808 |

| Conditional expression | Example10 | Example11 | Example12 |
|---|---|---|---|
| (1) $SF_{11}$ | 2.511 | 1.920 | 1.885 |
| (2) $SF_{12}$ | 2.699 | 2.195 | 2.808 |
| (3) $SF_{13}$ | −3.403 | −4.342 | −4.754 |
| (4) $SF_{14}$-$SF_{15}$ | 2.234 | 0.865 | 0.500 |
| (5) $SF_{21}$ | 1.179 | 2.279 | 0.925 |
| (6) $SF_{31}$ | 0.060 | 0.202 | 0.158 |
| (11) $\beta_{1PR}$ | 2.276 | — | — |
| (12) $Nd_{1PR}$ | 1.72916 | — | — |
| (13) $vd_{1PR}$ | 54.68 | — | — |
| (14) $\beta_{2NF}$ | 2.177 | 2.254 | — |
| (15) $Nd_{2NF}$ | 1.58313 | 1.88202 | — |
| (16) $vd_{2NF}$ | 59.38 | 37.22 | — |
| (A) f/$e_{N1F}$ | 0.645649424 | 0.416962387 | 0.397884552 |
| (B) (f/$e_{AS}$)/Fno | 0.676205414 | 0.480486104 | 0.493256505 |
| (C) $T_{air\_max}$/Σd | 0.132682123 | 0.104847505 | 0.107655992 |

The optical apparatus of the present embodiment includes an image pickup apparatus and a projection apparatus. Concrete examples of the image pickup apparatus and the projection apparatus will be described below.

Figure 13:
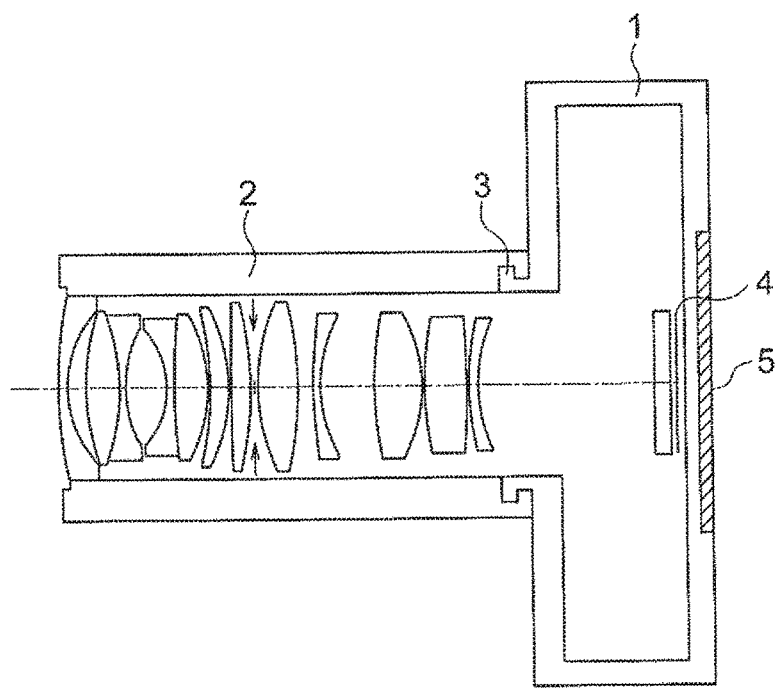
FIG. 13 is a cross-sectional view of an image pickup apparatus.

FIG. 13 is a cross-sectional view of a single-lens mirrorless camera as an electronic image pickup apparatus. In FIG. 13, a photographic optical system 2 is disposed inside a lens barrel of a single-lens mirrorless camera 1. A mount portion 3 enables the photographic optical system 2 to be detachable from a body of the single-lens mirrorless camera 1. As the mount portion 3, a mount such as a screw-type mount and a bayonet-type mount is to be used. In this example, a bayonet-type mount is used. Moreover, an image pickup element surface 4 and a back monitor 5 are disposed in the body of the single-lens mirrorless camera 1. As an image pickup element, an element such as a small-size CCD (charge coupled device) or a CMOS (complementary metal-oxide semiconductor) is to be used.

Moreover, as the photographic optical system 2 of the single-lens mirrorless camera 1, the single-focus optical system described in any one of the examples from the first example to the twelfth example is to be used.

Figure 14:
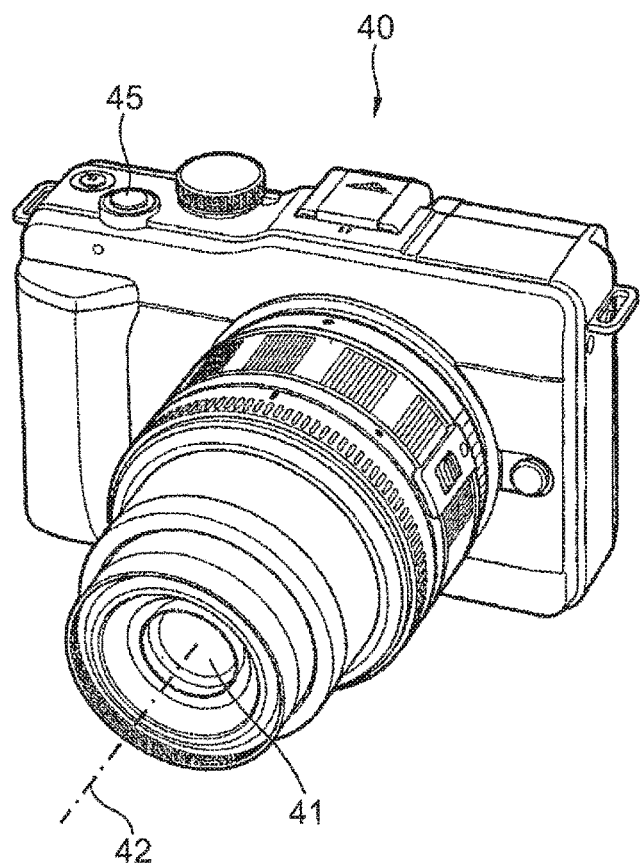
FIG. 14 is a front perspective view showing an appearance of the image pickup apparatus.
Figure 15:
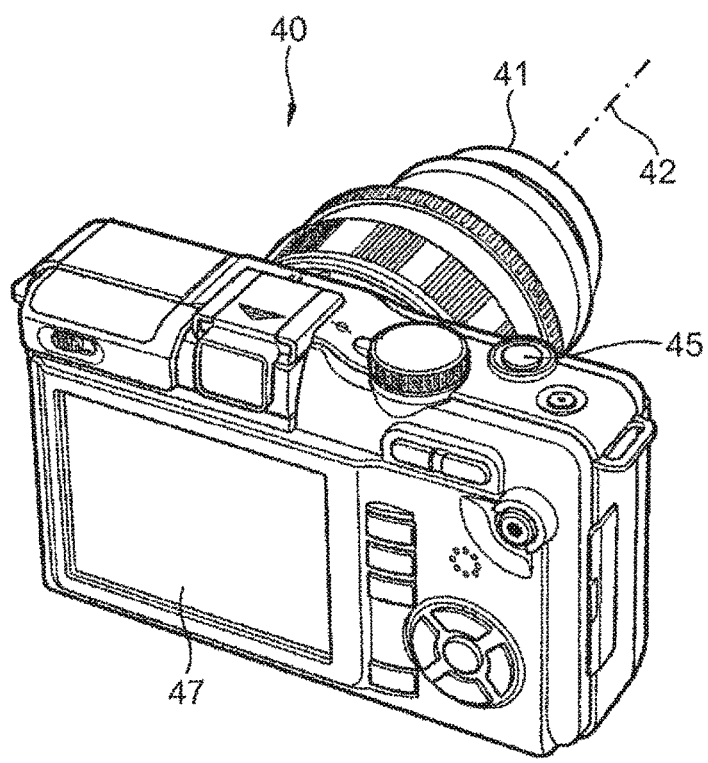
FIG. 15 is a rear perspective view of the image pickup apparatus.

FIG. 14 and FIG. 15 are conceptual diagrams of an arrangement of the image pickup apparatus. FIG. 14 is a front perspective view showing an appearance of a single-lens mirrorless camera 40 as the image pickup apparatus, and FIG. 15 is a rear perspective view of the single-lens mirrorless camera 40. The single-focus optical system according to the present examples from the first example to the twelfth example is used in a photographic optical system 41 of the single-lens mirrorless camera 40.

The single-lens mirrorless camera 40 according to the present embodiment includes the photographic optical system 41 which is positioned in a photographic optical path 42, a shutter button 45, and a liquid-crystal display monitor 47. As the shutter button 45 disposed on an upper portion of the single-lens mirrorless camera 40 is pressed, in conjunction with the pressing of the shutter button 45, photography is carried out by the photographic optical system 41 such as the single-focus optical system according to the first example. An object image which is formed by the photographic optical system 41 is formed on an image pickup element (photoelectric conversion surface) which is provided near an image forming surface. The object image which has been received optically by the image pickup element is displayed on the liquid-crystal display monitor 47 which is provided to a rear surface of the camera, as an electronic image by a processing means. Moreover, it is possible to record the electronic image which has been photographed, in a storage means.

Figure 16:
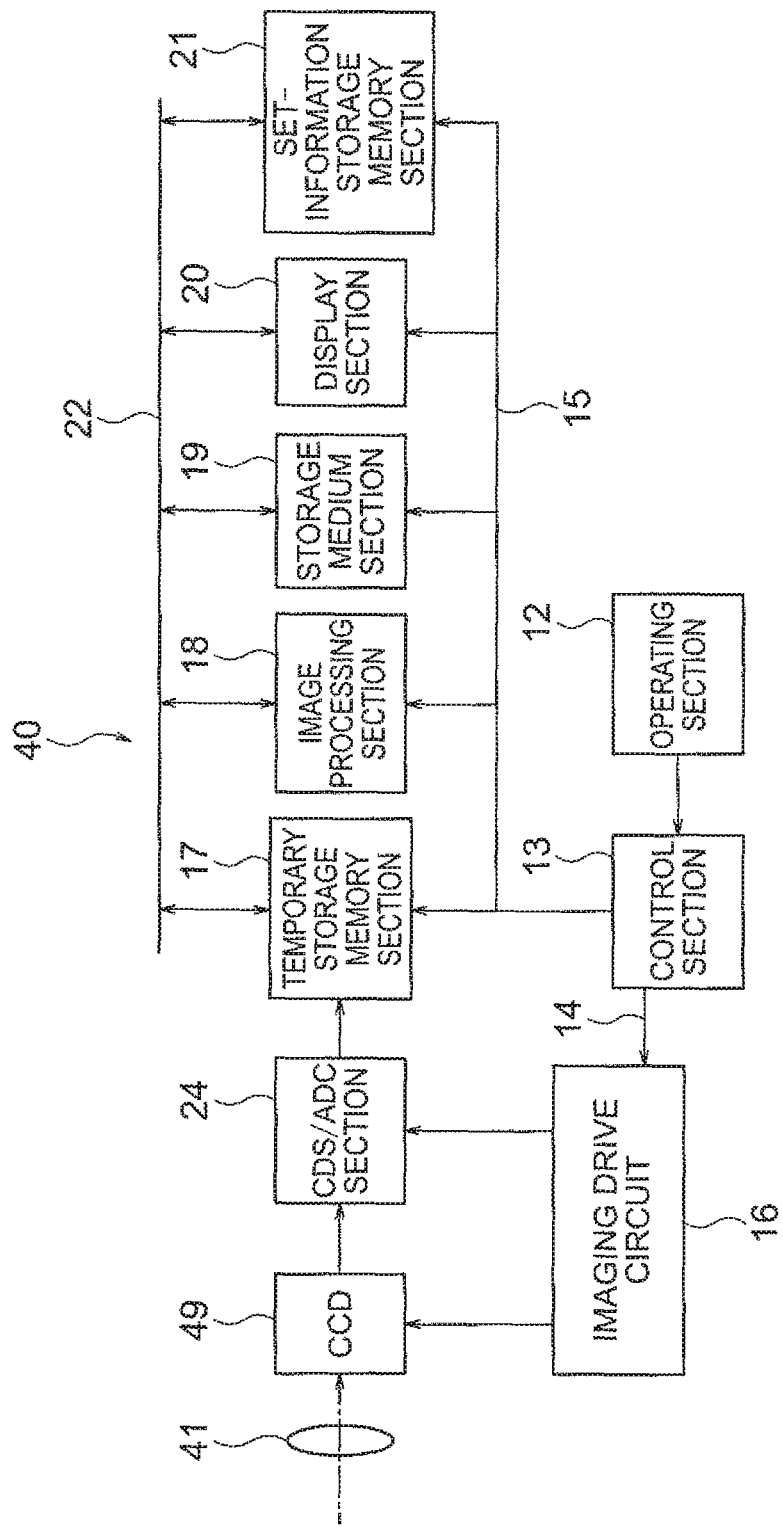
FIG. 16 is a structural block diagram of an internal circuit of main components of the image pickup apparatus.

FIG. 16 is a structural block diagram of an internal circuit of main components of the single-lens mirrorless camera 40. In the following description, the processing means described above includes for instance, a CDS/ADC section 24, a temporary storage memory 117, and an image processing section 18, and a storage means consists of a storage medium section 19 for example.

As shown in FIG. 16, the single-lens mirrorless camera 40 includes an operating section 12, a control section 13 which is connected to the operating section 12, the temporary storage memory 17 and an imaging drive circuit 16 which are connected to a control-signal output port of the control section 13, via a bus 14 and a bus 15, the image processing section 18, the storage medium section 19, a display section 20, and a set-information storage memory section 21.

The temporary storage memory 17, the image processing section 18, the storage medium section 19, the display section 20, and the set-information storage memory section 21 are structured to be capable of mutually inputting and outputting data via a bus 22. Moreover, the CCD 49 and the CDS/ADC section 24 are connected to the imaging drive circuit 16.

The operating section 12 includes various input buttons and switches, and informs the control section 13 of event information which is input from outside (by a user of the single-lens mirrorless camera) via these input buttons and switches. The control section 13 is a central processing unit (CPU), and has a built-in computer program memory which is not shown in the diagram. The control section 13 controls the entire single-lens mirrorless camera 40 according to a computer program stored in this computer program memory.

The CCD 49 is driven and controlled by the imaging drive circuit 16, and which converts an amount of light for each pixel of the object image formed by the photographic optical system 41 to an electric signal, and outputs to the CDS/ADC section 24.

The CDS/ADC section 24 is a circuit which amplifies the electric signal which is input from the CCD 49, and carries out analog/digital conversion, and outputs to the temporary storage memory 17 image raw data (Bayer data, hereinafter called as 'RAW data') which is only amplified and converted to digital data.

The temporary storage memory 17 is a buffer which includes an SDRAM (Synchronous Dynamic Random Access Memory) for example, and is a memory device which stores temporarily the RAW data which is output from the CDS/ADC section 24. The image processing section 18 is a circuit which reads the RAW data stored in the temporary storage memory 17, or the RAW data stored in the storage medium section 19, and carries out electrically various image-processing including the distortion correction, based on image-quality parameters specified by the control section 13.

The storage medium section 19 is a recording medium in the form of a card or a stick including a flash memory for instance, detachably mounted. The storage medium section 19 records and maintains the RAW data transferred from the temporary storage memory 17 and image data subjected to image processing in the image processing section 18 in the card flash memory and the stick flash memory.

The display section 20 includes the liquid-crystal display monitor, and displays photographed RAW data, image data and operation menu on the liquid-crystal display monitor. The set-information storage memory section 21 includes a ROM section in which various image quality parameters are stored in advance, and a RAM section which stores image quality parameters which are selected by an input operation on the operating section 12, from among the image quality parameters which are read from the ROM section.

In the single-lens mirrorless camera 40 configured in such an arrangement, by adopting the single-focus optical system according to the present invention as the photographic optical system 41, it is possible to capture an image in a wide photography range with low noise at high resolution. Moreover, it is possible to use the single-focus optical system according to the present invention in an image pickup apparatus of a type having a quick-return mirror.

Figure 17:
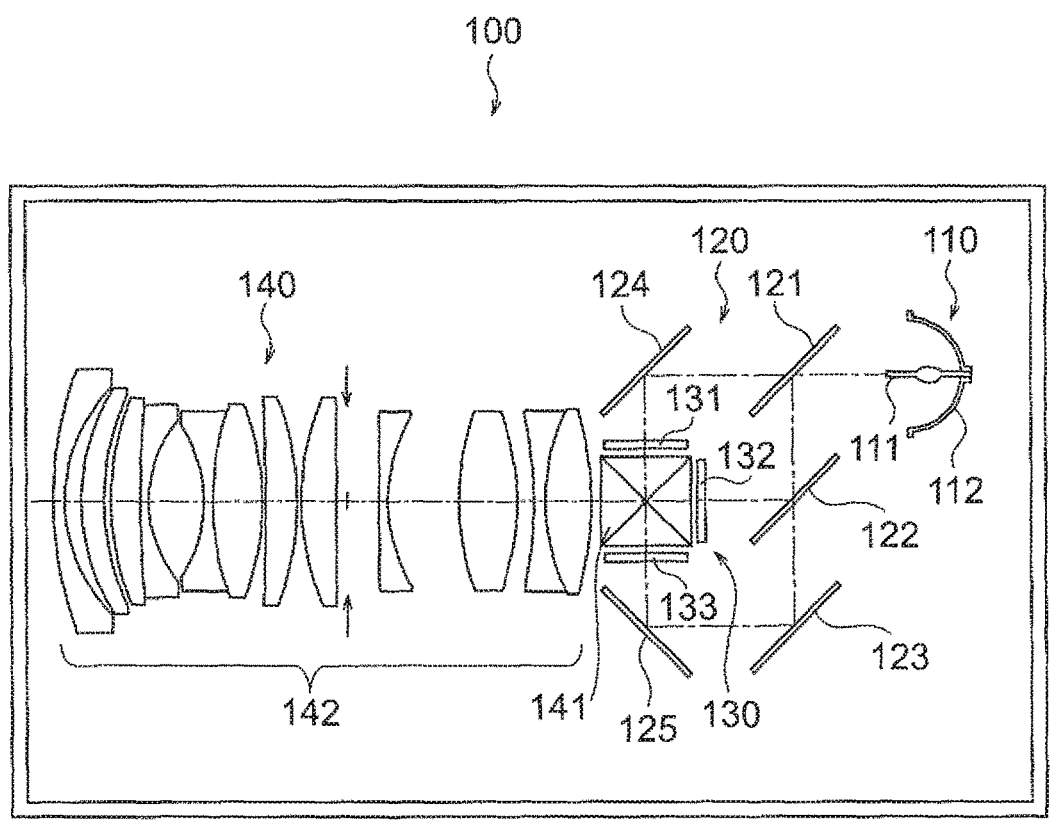
FIG. 17 is a cross-sectional view of a projection apparatus.

FIG. 17 is a sectional view of a projector as a projection apparatus. As illustrated in FIG. 17, a projector 100 includes a light source unit 110, an illumination unit 120, an image forming unit 130, and a projection unit 140.

The light source unit 110 includes a light source 111 and a reflective member 112. Illumination light is emitted from the light source 111. The illumination light is white light. The illumination light is reflected by the reflective member 112 and enters the illumination unit 120.

The illumination unit 120 includes a first dichroic mirror 121, a second dichroic mirror 122, a third dichroic mirror 123, a first reflective member 124, and a second reflective member 125.

In the first dichroic mirror 121, light in the red wavelength range (hereinafter referred to as "red light") is transmitted, and light in the other wavelength ranges is reflected. In the second dichroic mirror 122, light in the green wavelength range (hereinafter referred to as "green light") is reflected, and light in the other wavelength ranges is transmitted. In the third dichroic mirror 123, light in the blue wavelength range (hereinafter referred to as "blue light") is reflected, and light in the other wavelength ranges is transmitted. The red light, the green light, and the blue light enter the image forming unit 130. A general plane reflector may be used instead of the third dichroic mirror 123.

The image forming unit 130 has a first display element 131, a second display element 132, and a third display element 133.

The first display element 131 is irradiated with red light through the first reflective member 124. The second display element 132 is irradiated with green light. The third display element 133 is irradiated with blue light through the second reflective member 125.

Here, an identical image is displayed on the first display element 131, the second display element 132, and the third display element 133. Thus, a red image is displayed on the first display element 131, a green image is displayed on the second display element 132, and a blue image is displayed on the third display element 133.

Lights emitted from the first display element 131, the second display element 132, and the third display element 133 enter the projection unit 140.

The projection unit 140 includes a dichroic prism 141 and a projection optical system 142.

Lights emitted from the first display element 131, the second display element 132, and the third display element 133 are combined in the dichroic prism 141. As described above, a red image, a green image, and a blue image are displayed in the image forming unit 130. The three images are combined by the dichroic prism 141.

The projection optical system 142 projects the combined three images to a predetermined position. For example, the single-focus optical system illustrated in any one of examples from first examples to twelfth example above is used for this projection optical system 142.

The image forming unit 130 may be a light valve such as a digital micromirror device (DMD). In this case, light from the light source unit 110 is reflected by the light valve, and the image from the light valve is magnified and projected by the projection unit 140.

In the projector 100 thus configured, the single-focus optical system focal length lens of the present invention is employed as the projection optical system 142, whereby it is possible to project an image in a wide projection range with low noise at high resolution.

According to the present invention, it is possible to provide a single-focus optical system in which various aberrations are corrected favorably, while having a wide angle of view and a small F-number, and an optical apparatus using the same.

As it has been described above, the single-focus optical system according to the present invention is suitable for a single-focus optical system in which various aberrations are corrected favorably, while having a wide angle of view and a small F-number. Moreover, the optical apparatus according to the present invention is suitable for an image pickup apparatus which picks up an image over a wide photographing range, with a low noise, and a high resolution, and for a projection apparatus which projects an image over a wide projection range, with a low noise, and a high resolution.

What is claimed is:

1. A single-focus optical system which forms a conjugate relationship between a conjugate point on an enlargement side at a long distance and a conjugate point on a reduction side at a short distance, comprising in order from the enlargement side:
a first lens unit having a positive refractive power;
a second lens unit having a negative refractive power; and
a third lens unit having a positive refractive power, wherein:
a lens component is one of a single lens and a cemented lens, and
the first lens unit includes in order from the enlargement side, either a first sub-unit, a second sub-unit, and a third sub-unit, or the first sub-unit, one positive lens component, the second sub-unit, and the third sub-unit, and
the first sub-unit includes one of, a one negative lens component and a plurality of negative lens components that are continuous, and
the second sub-unit includes two meniscus lens components having respective concave surfaces thereof facing mutually, and
the third sub-unit includes a plurality of positive lens components disposed closest to the reduction side in the third sub-unit, and
the plurality of positive lens components includes all positive lens components that are adjacent, and
the first lens unit includes a cemented meniscus lens component in which a negative lens having a concave surface on the enlargement side and a positive lens are cemented in order from the enlargement side, and
the second lens unit includes one negative lens component, and
the third lens unit includes a negative lens, and also includes a positive lens component closest to the enlargement side, and
all air spaces in the first lens unit are constant all the time.

2. The single-focus optical system according to claim 1, wherein:
a reduction-side surface of the negative lens component in the second lens unit is a concave surface, and
a curvature of the reduction-side surface of the negative lens component in the second lens unit is larger than a curvature of an enlargement-side surface of the negative lens component in the second lens unit.

3. The single-focus optical system according to claim 1, wherein the third lens unit includes a positive lens and the negative lens on the reduction side of the positive lens component in the third lens unit.

4. The single-focus optical system according to claim 1, wherein:
the third lens unit includes a cemented lens on the reduction side of the positive lens component in the third lens unit, and
the cemented lens includes a positive lens and the negative lens.

5. The single-focus optical system according to claim 1, wherein:
the second sub-unit includes a cemented lens having a concave surface directed toward the enlargement side, and
one of the two meniscus lens components is the cemented lens in the second sub-unit, and
the cemented lens in the second sub-unit includes in order from the enlargement side, a negative lens and a positive lens.

6. The single-focus optical system according to claim 1, wherein:
the second sub-unit includes a cemented lens having a concave surface directed toward the enlargement side and a reduction-side lens component, and
one of the two meniscus lens components is the cemented lens in the second sub-unit, and the other of the two meniscus lens components is the reduction-side lens component, and
the cemented lens in the second sub-unit includes in order from the enlargement side, a negative lens and a positive lens, and
the reduction-side lens component is disposed on the enlargement side of the cemented lens in the second sub-unit, adjacent to the cemented lens in the second sub-unit, and
a shape of the reduction-side lens component is a meniscus shape having a convex surface directed toward the enlargement side.

7. The single-focus optical system according to claim 1, wherein:
the first lens unit includes an enlargement-side lens component closest to the enlargement side, and
the following conditional expression (1) is satisfied:

$$0.75 < SF_{11} < 3.5 \tag{1}$$

where, $SF_{11} = (R_{F11} + R_{R11})/(R_{F11} - R_{R11})$, and here $R_{F11}$ denotes a radius of curvature of an enlargement-side surface of the enlargement-side lens component, and
$R_{R11}$ denotes a radius of curvature of a reduction-side surface of the enlargement-side lens component.

8. The single-focus optical system according to claim 1, wherein:
the second sub-unit includes a reduction-side lens component, and
the reduction-side lens component is a meniscus lens component positioned on the enlargement side of the two meniscus lens components, and
the following conditional expression (2) is satisfied $$1.4 < SF_{12} < 15 \quad (2)$$

where, $SF_{12} = (R_{F12} + R_{R12})/(R_{F12} - R_{R12})$, and here $R_{F12}$ denotes a radius of curvature of an enlargement-side surface of the reduction-side lens component, and
$R_{R12}$ denotes a radius of curvature of a reduction-side surface of the reduction-side lens component.

9. The single-focus optical system according to claim 1, wherein:
the second sub-unit includes a cemented lens, and
the cemented lens in the second sub-unit is a meniscus lens component positioned on the reduction side of the two meniscus lens components, and
the following conditional expression (3) is satisfied:

$$-15 < SF_{13} < -2.0 \quad (3)$$

where, $SF_{13} = (R_{F13} + R_{R13})/(R_{F13} - R_{R13})$, and here $R_{F13}$ denotes a radius of curvature of an enlargement-side surface of the cemented lens in the second sub-unit, and
$R_{R13}$ denotes a radius of curvature of a reduction-side surface of the cemented lens in the second sub-unit.

10. The single-focus optical system according to claim 1, wherein:
the plurality of positive lens components in the third sub-unit includes all positive lens components that are adjacent on the reduction side, in the third sub-unit, and
the plurality of positive lens components includes a front positive lens component positioned closest to the enlargement side, and a rear positive lens component positioned closest to the reduction side, and
the following conditional expression (4) is satisfied:

$$0.10 < SF_{14} - SF_{15} < 7.0 \quad (4)$$

where, $SF_{14} = (R_{F14} + R_{R14})/(R_{F14} - R_{R14})$, $SF_{15} = (R_{F15} + R_{R15})/(R_{F15} - R_{R15})$, and here $R_{F14}$ denotes a radius of curvature of an enlargement-side surface of the front positive lens component,
$R_{R14}$ denotes a radius of curvature of a reduction-side surface of the front positive lens component,
$R_{F15}$ denotes a radius of curvature of an enlargement-side surface of the rear positive lens component, and
$R_{R15}$ denotes a radius of curvature of a reduction-side surface of the rear positive lens component.

11. The single-focus optical system according to claim 1, wherein the following conditional expression (6) is satisfied:

$$-0.4 < SF_{31} < 1.6 \quad (6)$$

where, $SF_{31} = (R_{F31} + R_{R31})/(R_{F31} - R_{R31})$, and here $R_{F31}$ denotes a radius of curvature of an enlargement-side surface of the positive lens component in the third lens unit, and
$R_{R31}$ denotes a radius of curvature of a reduction-side surface of the positive lens component in the third lens unit.

12. The single-focus optical system according to claim 1, wherein:
the first lens unit includes a reduction-side positive lens component closest to the reduction side, and
the reduction-side positive lens component is a single lens, and
in a rectangular coordinate system in which a horizontal axis is let to be $Nd_{1PR}$ and a vertical axis is let to be $vd_{1PR}$, when a straight line represented by $Nd_{1PR} = \alpha \times vd_{1PR} + \beta_{1PR}$, where, $\alpha = -0.01$, $Nd_{1PR}$ and $vd_{1PR}$ for the reduction-side positive lens component are included in both of an area determined by a straight line when a lower limit value of a range of the following conditional expression (11) is $\beta_{1PR} = 2.25$, and an area determined by the following conditional expressions (12) and (13):

$$2.25 \leq \beta_{1PR} \quad (11),$$

$$1.40 < Nd_{1PR} \quad (12), \text{ and}$$

$$35 < vd_{1PR} \quad (13)$$

where,
$Nd_{1PR}$ denotes a refractive index of the reduction-side positive lens component, and
$vd_{1PR}$ denotes Abbe number for the reduction-side positive lens component.

13. The single-focus optical system according to claim 1, wherein:
the negative lens component in the second lens unit is a single lens, and
in a rectangular coordinate system in which a horizontal axis is let to be $Nd_{2NF}$ and a vertical axis is let to be $vd_{2NF}$, when a straight line represented by $Nd_{2NF} = \alpha \times vd_{2NF} + \beta_{2NF}$, where, $\alpha = -0.01$, $Nd_{2NF}$ and $vd_{2NF}$ for the negative lens component in the second lens unit are included in both of an area determined by a straight line when a lower limit value of a range of the following conditional expression (14) is $\beta_{2NF} = 2.15$, and an area determined by the following conditional expressions (15) and (16):

$$2.15 \leq \beta_{2NF} \quad (14),$$

$$1.45 < Nd_{2NF} \quad (15), \text{ and}$$

$$25 < vd_{2NF} \quad (16)$$

where,
$Nd_{2NF}$ denotes a refractive index of the negative lens component in the second lens unit, and
$vd_{2NF}$ denotes Abbe number for the negative lens component in the second lens unit.

14. The single-focus optical system according to claim 1, wherein:
the first lens unit includes an enlargement-side lens component closest to the enlargement side, and
the following conditional expression (A) is satisfied:

$$0 < f/e_{N1F} < 2 \quad (A)$$

where,
f denotes a focal length of the overall single-focus optical system at the time of focusing to an object at infinity, and
$e_{N1F}$ denotes a maximum effective aperture of the enlargement-side lens component in the first lens unit.

15. The single-focus optical system according to claim 1, further comprising an aperture stop, wherein the following conditional expression (B) is satisfied:

$$0<(f/e_{AS})/Fno<2 \quad (B)$$

where,
f denotes a focal length of the overall single-focus optical system at the time of focusing to an object at infinity,
$e_{AS}$ denotes a maximum diameter of the aperture stop, and
Fno denotes an F-number for the overall single-focus optical system at the time of focusing to an object at infinity.

16. The single-focus optical system according to claim 1, wherein the following conditional expression (C) is satisfied:

$$0<T_{air\_max}/\Sigma d \leq 0.27 \quad (C)$$

where,
$T_{air\_max}$ is a largest axial air space in the range from a surface positioned closest to the enlargement side to a surface positioned closest to the reduction side in the single-focus optical system, and
$\Sigma d$ is an axial distance from the surface positioned closest to the enlargement side to the surface positioned closest to the reduction side in the single-focus optical system.

17. An optical apparatus comprising:
an optical system; and
an image pickup element which is disposed on a reduction side, wherein:
the image pickup element has an image pickup surface, and converts an image formed on the image pickup surface by the optical system to an electric signal, and
the optical system is the single-focus optical system according to claim 1.

18. An optical apparatus comprising:
an optical system; and
a display element which is disposed on a reduction side, wherein:
the display element has a display surface, and
an image displayed on the display surface is projected on the enlargement side by the optical system, and
the optical system is the single-focus optical system according to claim 1.

19. A single-focus optical system which forms a conjugate relationship between a conjugate point on an enlargement side at a long distance and a conjugate point on a reduction side at a short distance, comprising in order from the enlargement side:
a first lens unit having a positive refractive power;
a second lens unit having a negative refractive power; and
a third lens unit having a positive refractive power, wherein:
a lens component is one of a single lens and a cemented lens, and
the first lens unit includes in order from the enlargement side, either a first sub-unit, a second sub-unit, and a third sub-unit, or the first sub-unit, one positive lens component, the second sub-unit, and the third sub-unit, and the first sub-unit includes one of, a one negative lens component and a plurality of negative lens components that are continuous, and
the second sub-unit includes two meniscus lens components having respective concave surfaces thereof facing mutually, and
the third sub-unit includes a plurality of positive lens components disposed closest to the reduction side in the third sub-unit, and
the plurality of positive lens components includes all positive lens components that are adjacent, and
the second lens unit includes one negative lens component, and
the third lens unit includes a positive lens component closest to the enlargement side, and also includes a plurality of lenses on the reduction side of the positive lens component in the third lens unit, and
the plurality of lenses includes in order from the enlargement side, a positive lens, the negative lens, and a positive lens, and
all air spaces in the first lens unit are constant all the time.

20. A single-focus optical system which forms a conjugate relationship between a conjugate point on an enlargement side at a long distance and a conjugate point on a reduction side at a short distance, comprising in order from the enlargement side:
a first lens unit having a positive refractive power;
a second lens unit having a negative refractive power; and
a third lens unit having a positive refractive power, wherein:
a lens component is one of a single lens and a cemented lens, and
the first lens unit includes in order from the enlargement side, either a first sub-unit, a second sub-unit, and a third sub-unit, or the first sub-unit, one positive lens component, the second sub-unit, and the third sub-unit, and
the first sub-unit includes one of, a one negative lens component and a plurality of negative lens components that are continuous, and
the third sub-unit includes a plurality of positive lens components disposed closest to the reduction side in the third sub-unit, and
the plurality of positive lens components includes all positive lens components that are adjacent, and
the second lens unit includes one negative lens component, and
the third lens unit includes a negative lens, and also includes a positive lens component closest to the enlargement side, and
all air spaces in the first lens unit are constant all the time, and
a shape of the negative lens component in the second lens unit is a meniscus shape having a concave surface directed toward the reduction side, and
the negative lens component in the second lens unit moves on an optical axis for focusing.

21. A single-focus optical system which forms a conjugate relationship between a conjugate point on an enlargement side at a long distance and a conjugate point on a reduction side at a short distance, comprising in order from the enlargement side:
a first lens unit having a positive refractive power;
a second lens unit having a negative refractive power; and
a third lens unit having a positive refractive power, wherein:

a lens component is one of a single lens and a cemented lens, and the first lens unit includes in order from the enlargement side, either a first sub-unit, a second sub-unit, and a third sub-unit, or the first sub-unit, one positive lens component, the second sub-unit, and the third sub-unit, and the first sub-unit includes one of, a one negative lens component and a plurality of negative lens components that are continuous, and the third sub-unit includes a plurality of positive lens components disposed closest to the reduction side in the third sub-unit, and the plurality of positive lens components includes all positive lens components that are adjacent, and the second lens unit includes one negative lens component, and the third lens unit includes a negative lens, and also includes a positive lens component closest to the enlargement side, and all air spaces in the first lens unit are constant all the time, and only the positive lens component in the third lens unit is moved together with the second lens unit for focusing, while changing a distance between the second lens unit and the positive lens component in the third lens unit.

22. A single-focus optical system which forms a conjugate relationship between a conjugate point on an enlargement side at a long distance and a conjugate point on a reduction side at a short distance, comprising in order from the enlargement side:

a first lens unit having a positive refractive power;

a second lens unit having a negative refractive power; and a third lens unit having a positive refractive power, wherein:

a lens component is one of a single lens and a cemented lens, and the first lens unit includes in order from the enlargement side, either a first sub-unit, a second sub-unit, and a third sub-unit, or the first sub-unit, one positive lens component, the second sub-unit, and the third sub-unit, and the first sub-unit includes one of, a one negative lens component and a plurality of negative lens components that are continuous, and the third sub-unit includes a plurality of positive lens components disposed closest to the reduction side in the third sub-unit, and the plurality of positive lens components includes all positive lens components that are adjacent, and the plurality of positive lens components includes all positive lens components that are adjacent, and the second lens unit includes one negative lens component, and the third lens unit includes a negative lens, and also includes a positive lens component closest to the enlargement side, and all air spaces in the first lens unit are constant all the time, and the following conditional expression (5) is satisfied:

$$0.80 < SF_{21} < 4.0 \tag{5}$$

where, $SF_{21} = (R_{F21} + R_{R21})/(R_{F21} - R_{R21})$, and here $R_{F21}$ denotes a radius of curvature of an enlargement-side surface of the negative lens component in the second lens unit, and $R_{R21}$ denotes a radius of curvature of a reduction-side surface of the negative lens component in the second lens unit.

* * * * *